US008762890B2

(12) United States Patent
Falchuk et al.

(10) Patent No.: US 8,762,890 B2
(45) Date of Patent: Jun. 24, 2014

(54) SYSTEM AND METHOD FOR INTERACTIVE PROJECTION AND PLAYBACK OF RELEVANT MEDIA SEGMENTS ONTO THE FACETS OF THREE-DIMENSIONAL SHAPES

(75) Inventors: Benjamin Falchuk, Upper Nyack, NY (US); Chung Ying Wu, New York, NY (US)

(73) Assignee: Telcordia Technologies, Inc., Piscataway, NJ (US)

( * ) Notice: Subject to any disclaimer, the term of this patent is extended or adjusted under 35 U.S.C. 154(b) by 286 days.

(21) Appl. No.: 13/191,773

(22) Filed: Jul. 27, 2011

(65) Prior Publication Data
US 2012/0192115 A1 Jul. 26, 2012

Related U.S. Application Data

(60) Provisional application No. 61/367,945, filed on Jul. 27, 2010.

(51) Int. Cl.
*G06F 3/048* (2013.01)
*G06F 3/0481* (2013.01)

(52) U.S. Cl.
CPC .................................... *G06F 3/0481* (2013.01)
USPC ............................ 715/848; 715/850; 715/782

(58) Field of Classification Search
None
See application file for complete search history.

(56) References Cited

U.S. PATENT DOCUMENTS

| 5,495,562 A | 2/1996 | Denney et al. |
| 5,664,227 A | 9/1997 | Mauldin et al. |
| 5,852,435 A | 12/1998 | Vigneaux et al. |
| 5,890,152 A | 3/1999 | Rapaport et al. |
| 6,069,606 A | 5/2000 | Sciammarella et al. |
| 6,281,898 B1 | 8/2001 | Nikolovska et al. |
| 6,332,147 B1 | 12/2001 | Moran et al. |
| 6,526,219 B1 | 2/2003 | Posa et al. |
| 6,574,416 B1 | 6/2003 | Posa et al. |
| RE38,401 E | 1/2004 | Goldberg et al. |
| RE38,609 E | 10/2004 | Chen et al. |
| 6,807,361 B1 | 10/2004 | Girgensohn et al. |
| 6,977,659 B2 | 12/2005 | Dumitras et al. |
| 7,149,974 B2 | 12/2006 | Girgensohn et al. |
| 7,194,527 B2 | 3/2007 | Drucker et al. |

(Continued)

OTHER PUBLICATIONS

S.W. Smoliar, et al., "Content Based Video Indexing and Retrieval," IEEE Multimedia, vol. 1, Issue 2 pp. 62-72, Summer 1994.

(Continued)

*Primary Examiner* — Matt Kim
*Assistant Examiner* — Hua Lu
(74) *Attorney, Agent, or Firm* — Philip J. Feig

(57) ABSTRACT

A system for interactive media skimming and search on a device comprises a scene manager building a model of a 3D scene of a multimedia segment of the media visible on a screen of the device, facets of scene objects in the 3D scene are used to dynamically convey visual imagery as a texture from a multimedia source and maintaining a logical navigable relationship between the scene objects, the object facets and the multimedia segments, and further comprising an interaction manager, a user manager securely storing user information and preferences, a playback component initiating rough or high definition playback, a texturizer creating a 2D texture artifact from a set of the multimedia segments in the media for a 3D facet, a transformer transforming and modifying pixels, a cache and scene heuristics maintaining a set of 3D scenes comprising objects, object facets, a virtual camera, and positions of the objects.

23 Claims, 28 Drawing Sheets

EXAMPLE OF RELATED MEDIA OBJECTS IN-SCENE WITH A PRINCIPLE MEDIA

(56) References Cited

U.S. PATENT DOCUMENTS

| | | | |
|---|---|---|---|
| 7,246,322 B2 | 7/2007 | Neely et al. | |
| 7,274,741 B2 | 9/2007 | Ma et al. | |
| 7,437,005 B2 | 10/2008 | Drucker et al. | |
| 7,483,618 B1 | 1/2009 | Edwards et al. | |
| 7,559,039 B2 | 7/2009 | Ridgley et al. | |
| 7,664,775 B2 | 2/2010 | Reed et al. | |
| 7,689,525 B2 | 3/2010 | Drucker et al. | |
| 7,769,832 B2 | 8/2010 | Drucker et al. | |
| 7,806,767 B2 | 10/2010 | Kitao | |
| 7,877,707 B2 | 1/2011 | Westerman et al. | |
| 7,956,848 B2 | 6/2011 | Chaudhri | |
| 2002/0163546 A1* | 11/2002 | Gallo | 345/848 |
| 2004/0130566 A1* | 7/2004 | Banerjee et al. | 345/716 |
| 2005/0097135 A1 | 5/2005 | Epperson et al. | |
| 2005/0120053 A1 | 6/2005 | Watson | |
| 2005/0192924 A1 | 9/2005 | Drucker et al. | |
| 2005/0285875 A1* | 12/2005 | Kang et al. | 345/629 |
| 2005/0286759 A1* | 12/2005 | Zitnick et al. | 382/154 |
| 2006/0197753 A1 | 9/2006 | Hotelling | |
| 2007/0011603 A1 | 1/2007 | Makela | |
| 2007/0027839 A1 | 2/2007 | Ives | |
| 2007/0061247 A1 | 3/2007 | Ramer et al. | |
| 2007/0083818 A1 | 4/2007 | Drucker et al. | |
| 2007/0121015 A1 | 5/2007 | Gu et al. | |
| 2007/0220575 A1 | 9/2007 | Cooper et al. | |
| 2007/0250901 A1 | 10/2007 | McIntire et al. | |
| 2008/0088602 A1 | 4/2008 | Hotelling | |
| 2008/0092168 A1 | 4/2008 | Logan et al. | |
| 2008/0122796 A1 | 5/2008 | Jobs et al. | |
| 2008/0141175 A1* | 6/2008 | Sarna et al. | 715/848 |
| 2008/0194320 A1* | 8/2008 | Walsh et al. | 463/25 |
| 2008/0298643 A1 | 12/2008 | Lawther et al. | |
| 2009/0049384 A1* | 2/2009 | Yau | 715/716 |
| 2009/0058822 A1 | 3/2009 | Chaudhri | |
| 2009/0226044 A1 | 9/2009 | Ngan et al. | |
| 2009/0289937 A1 | 11/2009 | Flake et al. | |
| 2010/0045678 A1* | 2/2010 | Reid | 345/427 |
| 2010/0145794 A1 | 6/2010 | Barger et al. | |
| 2011/0029893 A1* | 2/2011 | Roberts et al. | 715/753 |

OTHER PUBLICATIONS

B. Falchuk, et al.,"A Tool for Video Content Understanding on Mobile Snriartphones," Proc. 10th ACM Int'l Conf. on Human-Computer Interaction with Mobile Devices and Services (MobileHCI 2008) Amsterdam, 2008.

J. A. Hartigan, et al., "A K-Means Clustering Algorithm," Journal of the Royal Statistical Society, vol. 27, pp. 100-108, 1978.

Patent Cooperation Treaty International Search Report, Sep. 16, 2011.

\* cited by examiner

FIG. 1
(PRIOR ART)
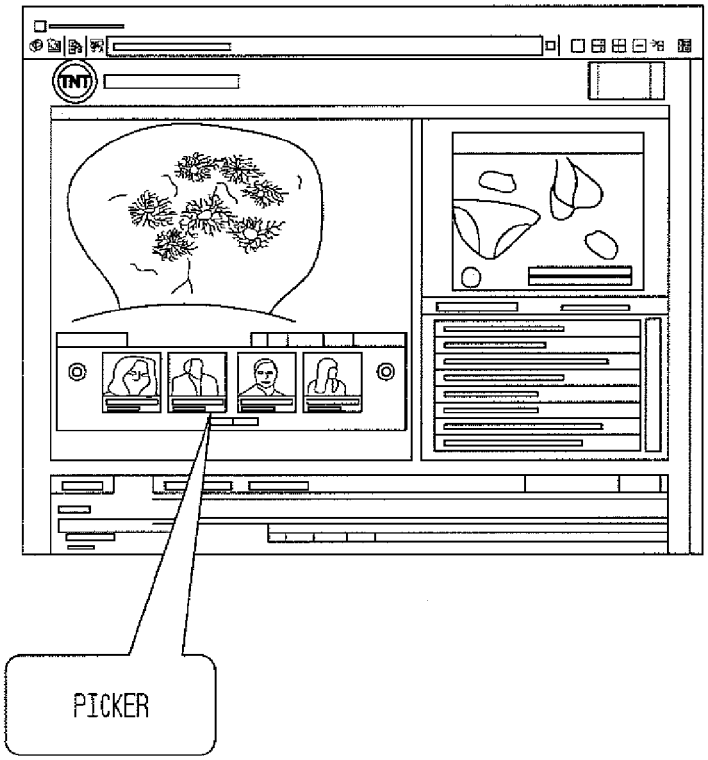
PICKER
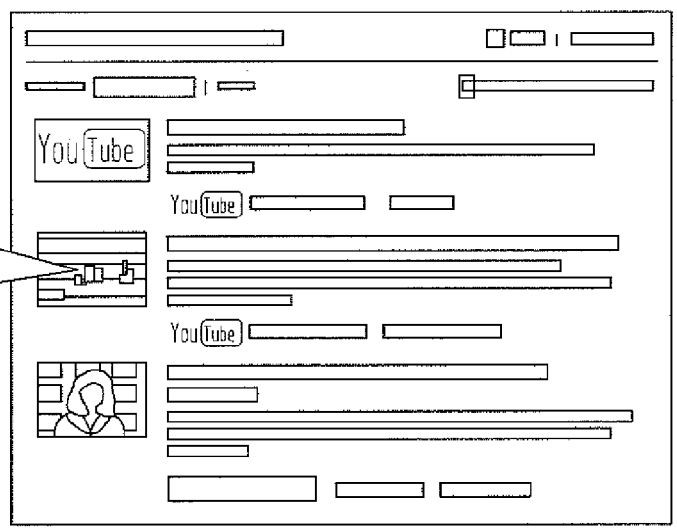
VIDEO PLAYS IN-PLACE ON MOUSE HOVER
HOVER OVER/ PLAYING ICON

EXAMPLE OF RELATED MEDIA OBJECTS IN-SCENE WITH A PRINCIPLE MEDIA

THE SYSTEM CAN GENERATE A "RELATED ITEMS" VIEW SUCH THAT NOT ONLY ARE RELATED ITEMS SHOWN ON THE SCREEN AS OBJECTS IN THE SCENE BUT THEY ARE SIZED AND POSITIONED PROPORTIONAL TO THEIR IMPORTANCE RELATIVE TO THE PRINCIPLE OBJECT (CENTRAL).

THE SYSTEM MAPS TEXTUAL
INFORMATION ONTO THE OBJECT
SUCH THAT IT CAN BE BROWSED
IN A SIMILAR FASHION TO
VISUAL INFORMATION

MUSIC/AUDIO AND OTHER
SORTS OF INFORMATION ARE
ALSO RELEVANT AND
AMENABLE TO INCLUSION

THE SYSTEM CAN TRANSFORM TEXTURES BY APPLYING SOPHISTICATED PROCESSES SUCH AS POSE EXTRACTION. IN THIS EXAMPLE, HUMAN POSES HAVE BEEN ABSTRACTED OUT TO SIMPLE "STICK FIGURES" WHICH HELPS THE USER UNDERSTAND THE ESSENCE OF THE VIDEO ACTION

ONE POSSIBLE MENU
SYSTEM

BACK- RESTORE PREVIOUS
MAPPING ON THE SHAPE

PREVIEW- SHOW A LOW-
RESOLUTION VERSION OF
THE MEDIA

PLAY- DISPLAY A HIGH-
RESOLUTION VERSION OF
THE MEDIA

RESET- GO BACK TO AN
INITIAL VIEW

MEDIA INFO- SHOW
METADATA

MORE- MORE OPTIONS

SYSTEM AND METHOD FOR INTERACTIVE PROJECTION AND PLAYBACK OF RELEVANT MEDIA SEGMENTS ONTO THE FACETS OF THREE-DIMENSIONAL SHAPES

CROSS REFERENCE TO RELATED APPLICATIONS

The present invention claims the benefit of U.S. provisional patent application 61/367,945 filed Jul. 27, 2010, the entire contents and disclosure of which are incorporated herein by reference as if fully set forth herein.

FIELD OF THE INVENTION

This invention relates generally to mobile and desktop services, interactive information visualization, and media summarization, analysis, and accessibility.

BACKGROUND OF THE INVENTION

Digital media (also known as multimedia) can be any of movies, e.g., short clips, television shows, movie trailers, feature length movies, etc., imagery, e.g., photographs, images, or parameterizations of images such as histograms, etc., text, e.g. printed words or symbols, such as sheet music, in digital form, music, such as visual representations of sound such as sheet music, notes on musical staffs, etc., or spectrograms, and so on. Today, multimedia is a principle part of a majority of Websites and accordingly, media analytics, summarization and skimming are of increasing importance. Summarization is the technique of condensing and abstracting multimedia, while analytics is the general technique of gaining insight from examining media segments and information. Skimming is the act of navigating through the summarization as well as optionally through original source with the help of a computer interface (typically of visual nature but also can involve other human senses).

The search for interaction and visualization techniques for digital media has a long and diverse heritage. Various two-dimensional (2D) techniques are prevalent on the Web and mobile Web and desktop. The most well-known includes chart-like visualizations in which two dimensions of information are shown such as in a long horizontal scrollable pick-list of images. Different types of graphs with a third dimension (3D) have long been used to capture multidimensional information and are used ubiquitously. Info-graphics, such as those found in magazines and newspapers such as USA Today™ sometimes present information in print in highly stylized scenes to create the visual effect of information within scenes. These current techniques do not employ scenes and are not typically interactive and are seldom applied to complex multimedia.

There is currently a need for drastically different and improved visual interaction techniques to support comprehensive exploration and analysis of multimedia—particularly video. Virtually all Web sites involved with the storage and transmission of Internet video offer only the ability to search through a pre-selected shortlist of scenes via linear, limiting and coarse-grained techniques. As multimedia is complex, however, queries become more conceptual, such as users wondering, "Is this the episode where the microwave oven catches aflame at one point?". Such concept queries are problematic for the current art.

FIG. 1 illustrates two such techniques. On the top, a Horizontal Picker of scenes—also known as a 'gallery'—is shown; this is typically accompanied by the tip, "Choose a scene to begin playing from there." This technique is effective if, for example, the system has fortuitously pre-selected scenes that the user has interest in, but largely it is not effective as a skimming or as a summarization technique since only the pre-selected scenes are offered as candidates. On the bottom of the figure, the hover-over playback technique is shown in which the keyframe begins a simply playback when the user hovers the mouse over the icon and stops when the mouse leaves the icon. While playing back, the entire video may be played, or just segments or a fast forward version and so on. This technique almost always limits users to view a particular subset of media segments, e.g., video frames, played back when the mouse hovers over the icon. In addition, the playback is almost always very coarse, non interactive, and limited to a predetermined, small set of keyframes preventing the user from "exploring" the media in a meaningful or deep way. Further, this class of solution is a linear solution and provides only the most basic assistance to users with higher conceptual searches in mind.

Mobile media skimming is similarly primitive as in the desktop case and the problems are exacerbated by smaller screen sizes of mobile devices. None of the many mobile offerings from companies such as Sling Media, Joost, Veoh, Flixster, AT&T® and Sprint® enable rich or effective within-video skimming. Most of the above provide keyword search, simple "TV-guide" like interfaces, and extremely limited "choose a scene"-type action indexing.

Other approaches to viewing media using only sphere representation do not allow dynamic adaptation and do not support the interactive exploration of the media units on the sphere with respect to range, focus, and time. For example, many approaches exist for adjusting the virtual camera in three-dimensional ("3D") gaining worlds as well as defining textures that are mapped to 3D virtual objects to give them their "skin". For example, one approach in video games wraps texture maps around 3D characters in order to create visually convincing characters. However, this approach is not interactive and the texture is not at all a conveyance of media semantic. In the video game use case, the textures are not typically loaded from a remote server but loaded as the shapes locally once from the same place. Places on the character are not interactive to the "touch" of users. These solutions are effective in their own right but do not address an interactive and information-centric approach.

There is a need to improve media analytics and summarization and do so in a way that does not force the end user to enter search terms or otherwise understand textual information (thus the user could be illiterate and still search effectively). The problem revolves around the use of digital technologies to provide insight into media in rapid skimming sessions that are not overly long to perform nor overly non-intuitive. And while 2D is effective, one can now display 3D representations (or visual "metaphors") on virtually all medium including laptops, tablets, and smartphones, thanks to improved software and hardware graphics acceleration. An effective use of 3D metaphor can drastically improve the skimming experience so the problem becomes: how to create a 3D metaphor on the device screen (independent of the device type) that effectively and intuitively conveys a skimming session for the user who is looking to perform analytics and experience summarization on the media.

SUMMARY OF THE INVENTION

An inventive interactive system and method for media skimming and searching is presented. This method creates a user-interface featuring 3D scenes and shapes adorned with static and live media information in such a way that the shapes themselves become interactive visualization surfaces, helping users analyze and understand the underlying rich content without having to load that rich content immediately or in full.

The inventive technique can be very effective on many rich content resource types and multimedia including video, such as television and movies, all sorts of user generated content as found on sites such as YouTube, Flickr, and others, imagery, photography, GIS and/or map data, e-books and illustrated content, sheet music, medical information, artistic imagery, dance choreography, contacts, music information, scientific data such as flow diagrams, spectrograms, and so on. We use the terms media and multimedia in reference to any sort of information through which a user might like to skim or search. We use the term media segment (or just segment) to refer to a small portion of a multimedia entity such as: one photo from a large set, a small part of a large photo (e.g., the area near the bottom right corner), one bar of music from a larger piece, one page from a book, one word from a page, one video scene from a whole video, or one video frame from a video scene.

Our approach is far more sophisticated than the aforementioned hover-over and linear "picker" techniques. Our approach involves a 3D metaphor and an open set of media segments which do not limit the user's skimming session; it also involves non-linear movement through the multimedia meaning that the user can freely change point of view, as opposed to the linear (time expensive) class of solutions known in the art.

A system for interactive media skimming and search on a device comprises a scene manager operable to build a model of a 3D scene of a multimedia segment of the media visible on a screen of the device in which one or more facets of scene objects are used to dynamically convey visual imagery as a texture from a multimedia source and operable to maintain a logical navigable relationship between the scene objects, the object facets and the multimedia segments; an interaction manager operable to catch and manage interactions of a user with the model of the 3D scene, operable to instruct the scene manager to map screen pixels to the object facets and in turn to the multimedia segments, and operable to simplify user experience by limiting interaction parsing when in particular modes; a user manager operable to securely store a user name, password, authorizations, and user preferences comprising at least preferred 3D scene types for particular multimedia categories; a playback component operable to initiate one of rough playback and high definition playback in response to a user interaction and operable to determine an appropriate facet on a 3D shape in the 3D scene and to transform the multimedia such that the multimedia appears to play upon the appropriate facet; a texturizer operable to create a 2D texture artifact from a specified set of the multimedia segments in the media for a particular target 3D facet such that resulting operations to view the texture as if stretched onto the particular target 3D facet are successful and make one or more perspective of the multimedia clearly visible on the particular target 3D facet; a transformer operable to transform and modify pixels of one or more of chosen media segments and textures in response to requests such that the resulting 2D texture artifact contains new information via the pixels that are revealed in full only when the resulting 2D texture artifact is projected onto one or more shape facets in the 3D scene; a cache operable to store and index one or more of the media segments, the textures, scene metadata, and the preferred 3D scene types and objects correlated to the multimedia categories and individual segments; and scene heuristics operable to maintain a set of 3D scenes comprising one or more objects, object facets, a virtual camera, and positions of the objects relative to the camera and the relationship of each set of the set of 3D scenes to a particular multimedia category or to a specific set of named multimedia resources, wherein when a valid user name and password are determined by the user manager, the scene manager builds the model in accordance with the texturizer, the transformer and the cache.

In one aspect, one or more of the interactions caught and managed by the interaction manager are interpreted as instructions to rotate, scale, and translate 3D shapes whose surfaces have been mapped with cues, summaries, or other information relevant to the interactive media skimming and search. In one aspect, the scene manager is further operable to select a 3D shape and a means for ordering visual information upon facets of the 3D shape wherein a series of ordered media segments are ordered such that coarse segment ordering can be visually seen upon one aspect of the 3D shape and segment action can be visible upon another aspect of the 3D shape. In one aspect, the scene manager is further operable to perform one or more of dynamically adapting the 3D scene between skimming sessions, and dynamically creating a related media scene for any given media such that 3D shapes are placed in relation to each other and the virtual camera so that relative position of the 3D shapes and the virtual camera to a principle shape convey relevance to the principle shape and each placed 3D shape conveys media information via interactions with the texturizer and the transformer. In one aspect, the scene manager is further operable to choose 3D shapes that have initially obscured facets and to use the texturizer and the transformer to create projections of multimedia content onto both obscured and visible facets, making a view of the initially obscured facets visible only via particular predefined user interactions.

In one aspect, the interaction manager is further operable to perform one or more of decomposing and then limiting and enhancing user interactions with the interaction manager, differentiating exploratory user interactions from user interactions showing interest or disinterest in the visible contents on the 3D scene, and affecting the virtual camera actions based on decomposed and processed user interactions. In one aspect, the high definition playback launches an external player with metadata about a current scene and current location being browsed within the media. In one aspect, the texturizer is further operable to perform one or more of confirming a texture file to correspond to a given request for a particular object type, and creating a texture shape for the particular object type from the specified set of media segments. In one aspect, the transformer is further operable to receive as input identification of a media resource, and to create as output a handle to the transformed media, wherein the resulting media has one of an advertisement bitmap stitched into a form of the resulting media, the resulting media has a new form making the resulting media more suitable as a texture for a particular 3D shape, and the resulting media includes highlighted information that did not exist in the original. In one aspect, the transformer creates the output by determining semantics of a current view item or texture, determining a preferred cardinality and placement of advertisement bitmaps, determining specific segments having associated advertisements, replacing or augmenting the specific segments with advertisement images, and storing instructions describing how to respond to inputs on the specific segments containing the advertisement images. In one aspect, user input on particular advertisements embedded by the system into the textures results in an optional virtual camera repositioning and new info nation related to the particular advertisement displaying on a particular set of facets of one or more of the 3D shapes in the 3D scene. In one aspect, a user interaction upon the 3D scene results in an adjustment comprising one or more of rotation, translation, or scale of shapes in the scene, wherein as the adjustment occurs in view of the user, the rapidly changing visible imagery conveys what appears to the user as an animated view of a multimedia segment in playback.

A method for interactive media skimming and search on a device comprises steps of building a model of a 3D scene of a multimedia segment of the media visible on a screen of the device in which one or more facets of scene objects are used to dynamically convey visual imagery as a texture from a multimedia source and maintaining a logical navigable relationship between the scene objects, the object facets and the multimedia segments; catching and managing interactions of a user with the model of the 3D scene, mapping screen pixels to the object facets and in turn to the multimedia segments, and simplifying user experience by limiting interaction parsing when in particular modes; securely storing a user name, password, authorizations, and user preferences comprising at least preferred 3D scene types for particular multimedia categories; initiating one of rough playback and high definition playback in response to a user interaction and determining an appropriate facet on a 3D shape in the 3D scene and transforming the multimedia such that the multimedia appears to play upon the appropriate facet; creating, using a texturizer, a 2D texture artifact from a specified set of the multimedia segments in the media for a particular target 3D facet such that resulting operations to view the texture as if stretched onto the particular target 3D facet are successful and make one or more perspective of the multimedia clearly visible on the particular target 3D facet; transforming and modifying, using a transformer, pixels of one or more of chosen media segments and textures in response to requests such that the resulting 2D texture artifact contains new information via the pixels that are revealed in full only when the resulting 2D texture artifact is projected onto one or more shape facets in the 3D scene; storing and indexing one or more of the media segments, the textures, scene metadata, and the preferred 3D scene types and objects correlated to the multimedia categories and individual segments; and maintaining a set of 3D scenes comprising one or more objects, object facets, a virtual camera, and positions of the objects relative to the camera and the relationship of each set of the set of 3D scenes to a particular multimedia category or to a specific set of named multimedia resources, wherein when a valid user name and password are determined, building the model is performed in accordance with the texturizer, the transformer, and storing and indexing the media segments.

In one aspect, one or more of the interactions are interpreted as instructions to rotate, scale, and translate 3D shapes whose surfaces have been mapped with cues, summaries, or other information relevant to the interactive media skimming and search. In one aspect, building the model further comprising selecting a 3D shape and a means for ordering visual information upon facets of the 3D shape wherein a series of ordered media segments are ordered such that coarse segment ordering can be visually seen upon one aspect of the 3D shape and segment action can be visible upon another aspect of the 3D shape. In one aspect, building the model further comprising performing one or more of dynamically adapting the 3D scene between skimming sessions, and dynamically creating a related media scene for any given media such that 3D shapes are placed in relation to each other and the virtual camera so that relative position of the 3D shapes and the virtual camera to a principle shape convey relevance to the principle shape and each placed 3D shape conveys media information via interactions with the texturizer and the transformer. In one aspect, building the model further comprises choosing 3D shapes that have initially obscured facets and to use the texturizer and the transformer to create projections of multimedia content onto both obscured and visible facets, making a view of the initially obscured facets visible only via particular predefined user interactions. In one aspect, catching and managing interactions further comprises one or more of decomposing and then limiting and enhancing user interactions with the interaction manager, differentiating exploratory user interactions from user interactions showing interest or disinterest in the visible contents on the 3D scene, and affecting the virtual camera actions based on decomposed and processed user interactions.

In one aspect, the high definition playback launches an external player with metadata about a current scene and current location being browsed within the media. In one aspect, creating the 2D artifact further comprises one or more of confirming a texture file to correspond to a given request for a particular object type, and creating a texture shape for the particular object type from the specified set of media segments. In one aspect, transforming and modifying pixels of the one or more chosen media segments further comprises receiving as input identification of a media resource, and creating as output a handle to the transformed media, wherein the resulting media has one of an advertisement bitmap stitched into a form of the resulting media, the resulting media has a new form making the resulting media more suitable as a texture for a particular 3D shape, and the resulting media includes highlighted information that did not exist in the original. In one aspect, the output is created by determining semantics of a current view item or texture, determining a preferred cardinality and placement of advertisement bitmaps, determining specific segments having associated advertisements, replacing or augmenting the specific segments with advertisement images, and storing instructions describing how to respond to inputs on the specific segments containing the advertisement images. In one aspect, user input on particular advertisements embedded by the system into the textures results in an optional virtual camera repositioning and new information related to the particular advertisement displaying on a particular set of facets of one or more of the 3D shapes in the 3D scene. In one aspect, a user interaction upon the 3D scene results in an adjustment comprising one or more of rotation, translation, or scale of shapes in the scene, wherein as the adjustment occurs in view of the user, the rapidly changing visible imagery conveys what appears to the user as an animated view of a multimedia segment in playback.

A computer readable storage medium storing a program of instructions executable by a machine to perform one or more methods described herein also may be provided.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 1 illustrates known techniques for examining digital media.

DETAILED DISCLOSURE

A system and method for creating an adaptive, interactive, 3D user-interface featuring 3D scenes and shapes for multimedia skimming is presented.

Figure 2:
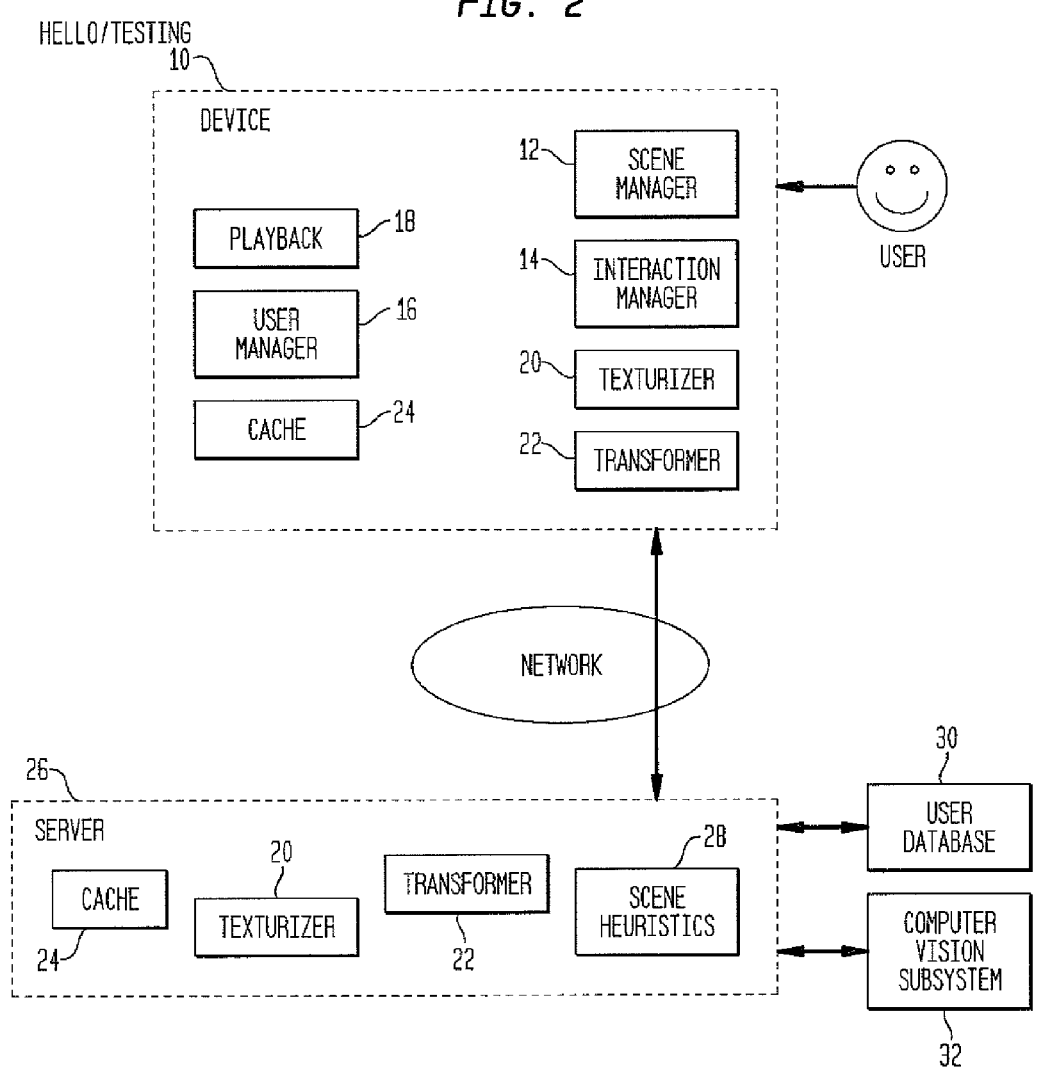
FIG. 2 is a block diagram of an embodiment of the inventive system.

FIG. 2 is a block diagram of an embodiment of the inventive system having a device 10 with the following components: Scene Manager 12, Interaction Manager 14, User Manager 16, Playback 18, Texturizer 20, Transformer 22 and Cache 24. As shown in FIG. 2, a Server 26 can comprise Scene Heuristics 28 as well as one or more of the functions such as the cache, the texturizer, the transformer. The Server 26 can be connected to additional devices and/or information such as a user database 30, computer vision subsystems 32, etc. In other embodiments, server functions may be co-located with device functions. The media to be examined can reside in a database or other media repository; this media is accessible to the device either directly or indirectly via the server.

The Scene Manager 12 can build a model of the 3D scene visible upon the screen of the device 10. One exemplary technology allowing 3D scene creation is OpenGL (and its variants). In the model, a scene S contains a set O of objects O1, O2, . . . O$_n$. Each object is a closed or open surface, and each can be thought of as decomposable into a set F of surfaces F1, F2, . . . F$_m$, ordered along a coordinate axis called the scene-axis. These surfaces, which may be flat or curved facets, are ordered so that media can later be mapped to them. Pre-set heuristics can provide 'best practices' for object choice and surface decomposition and for mapping media to those. It is possible that these heuristics can be used even when given an arbitrary but canonically described media never before encountered by the system by finding similar media that have previously been adapted to 3D scenes.

The Scene Manager 12 can also adapt the scene between skimming sessions. For example, the scene can be adapted based upon the nature of the content currently (or deemed to be imminently) visible on the screen and in a dynamic nature during skimming sessions: in one embodiment, for example, by evaluating the current scene and content type of media, using metrics (e.g., scene-cut rate, dominant colors, etc.) to modify the scene of shapes. In addition, the scene can be adapted based on a request from the user of the system, or by another system component who requests scene change.

The Scene Manager 12 can create the "related media" scene for any given media M by determining the top n related media to M and sorting them by their relevance metric (e.g., similarity), and creating new temporary objects in the scene for each media, texturing the objects with appropriate media segments, and positioning the objects in positions relative to the main object so that their distance to the main object is proportional to their relevance. The Scene Manager 12 can use a function available on a network if necessary by using an appropriate network transport request to subsequently determine the n related media, to sort them, or to customize the set for the current user.

The Interaction Manager (IM) 14 component catches and manages interactions that the user makes with the inventive tool, the interactions being events such as gestures, taps, and menu selections as well as other interactions as appropriate. The IM also limits and enhances the available gestures on the scene depending on the mode that the application is in. For example, in "concentration mode" (described in more detail below) the IM limits gesture recognition solely to horizontal swipes and disregards the vertical components of user swipe gestures.

The IM determines where on the input/output device screen the user has interacted and correlates this location to a multimedia segment by mapping it through the facet. Hence, pixel relates to/points to facet which points to/indicates segment (pixel→facet→segment), enabling the system to understand the segment of interest via the user interaction with his device screen.

The IM also differentiates user input in other ways. Interest in particular scenes can be conveyed via user tap interactions or mouse clicks upon the scene shapes. For example, the IM can derive the current media scene MS selected by first correlating the position P on the screen to a shape S in the scene, and then correlating to a facet F on the shape. F is then mapped to a set of media units, e.g., a scene, and the containing MS is found. Further, scene disinterest inputs are mapped to operations that redraw the scene with additional context (less emphasis on uninteresting scene) or an initial or default scene view.

The IM can realize virtual camera controls as drags or taps change the view on the current scene as seen by the user. User inputs are mapped to camera or scene positioning and are affected in real-time. For example, a user drags his finger upwards on the screen to cause the virtual camera to move "away" from the scene proportionately.

The User Manager 16 component can store the user name and password in secure fashion. The User Manager can gather and store user preferences including, but not limited to, scene and object type preferences, user interests and media type preferences. In one embodiment, the User Manager can store a user profile.

The Playback 18 component initiates one of two types of playback. One type is called rough playback, in which a texture is created on one or more of the facets and shapes in the scene and is continually updated until the selected or preferred media segment has "played out". The other type is called high definition, in which an external player is launched and provided, where possible, with the metadata about the current scene and current location of browse within the media. For example, if the user is browsing at time t=52 min. of the media, then the playback may attempt to start from there, or from the start of the media.

The Texturizer 20 component can perform the following functions. It can create a 2D texture file from a specified set of media segments such as video frames, still images, e-book pages, etc. The Texturizer can also confirm the texture file to correspond to a given request for a particular object type or facet, which is described using a machine readable canonical notation (such as XML schema). For example, a texture destined for a sphere shape is generated differently than one destined for a cube shape but the Texturizer is able to create either texture shape from a given media set. The Texturizer can use a function available on a network if necessary by using the appropriate network transport request and requested access to remote data in order to achieve the request. Optionally, the Texturizer can store and index data in a local cache.

The Transformer 22 component transforms and modifies media segments, textures or parts of texture files in response to requests. Input to Transformer can be the identification of a multimedia resource to which Transformer has a handle, the input parameters describing the kind of transformation required, and so on. Output can be a handle to the transformed media segment. In one embodiment, transformation includes inserting advertisement bitmaps within texture bitmaps which the user subsequently sees when skimming the multimedia via the scene.

The steps performed by Transformer to create output can include the following. First, determine the semantic of the content on the current texture. Second, determine the rate of ad occurrence that is preferred. Third, determine specific segments, if any, on the segments that have associated ads. Fourth, replace the specific segments in the texture with ad images. Fifth, instruct IM how to react to inputs on this segment, e.g., by spawning an ad text or a Web page for the ad.

As examples, transformative operations performed by Transformer might include the following: resizing or scaling imagery, adding visual annotations such as borders, callouts, and imagery, adding virtual textures such as bump-maps, grass effects and rock textures to imagery, extracting human poses, identifying and highlighting objects or actions, optionally storing and indexing data in cache, using a function available on a network if necessary by using appropriate network transport request.

The Cache 24 component can store and index media segments, textures, scene metadata. Cache can also refresh and purge either on-demand from other components or on a schedule, or both.

The Scene Heuristics 28 component maintains a set G of 3D scenes comprising one or more objects. These scenes have ratings and meta-tags such that they can be related back to media. For example, G might contain a scene S1 which describes a sphere and a cube and their positional description, as well as a mapping for multimedia information onto the facet set F of each shape in the scene S1.

Scene Heuristics uses a mapping technique for an arbitrary scene or draws from a set of commonly used scenes (and associated orientations) applicable to particular types of media. An exemplary mapping technique can include, for example, a 3D Scene A containing an Object B, B's facet set {F1, F2, . . . }, and an orientation that provides an unambiguous ordered mapping of the facet set to multimedia segments. The same scene A may not be appropriate for Media Type B (e.g., sports videos) and thus Scene Heuristics would be aware of such an incompatibility.

Figure 3:
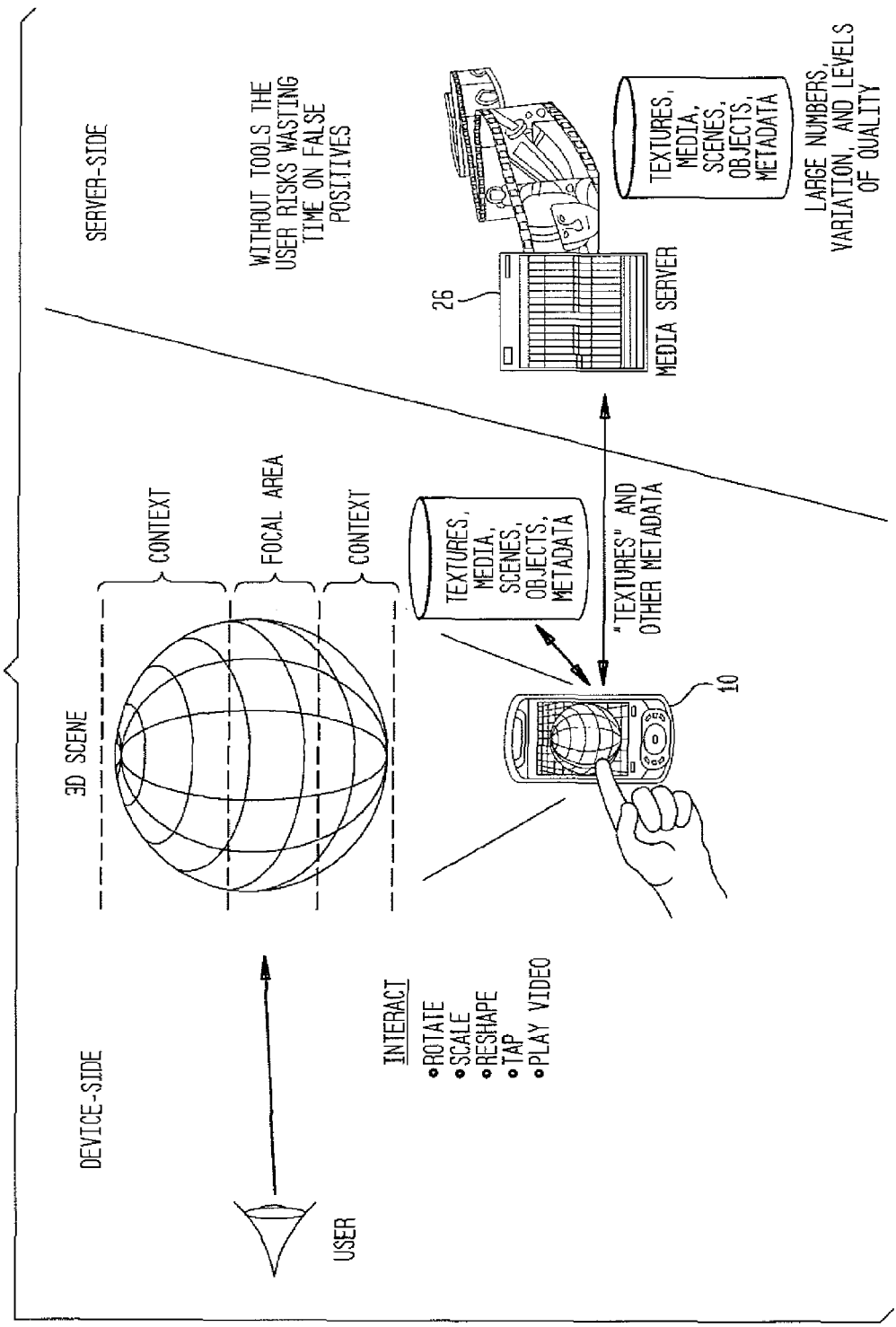
FIG. 3 shows an embodiment of the inventive system and method.

FIG. 3 shows an exemplary embodiment of the inventive system and method. As shown in FIG. 3, the device 10 is a mobile device, on which a 3D scene is displayed using a spherical shape. The focal area is comprised of facets around the circumference of the sphere and the remainder of the sphere illustrates media content. A user can interact with the sphere by performing various functions such as rotate, scale, reshape, tap, play video, etc. Textures, media, scenes, objects and metadata are available to the device from a database or databases either on the device side or on the server side or both. In this embodiment, the textures mapped onto shape facets comprise a useful visualization for skimming.

Figure 4:
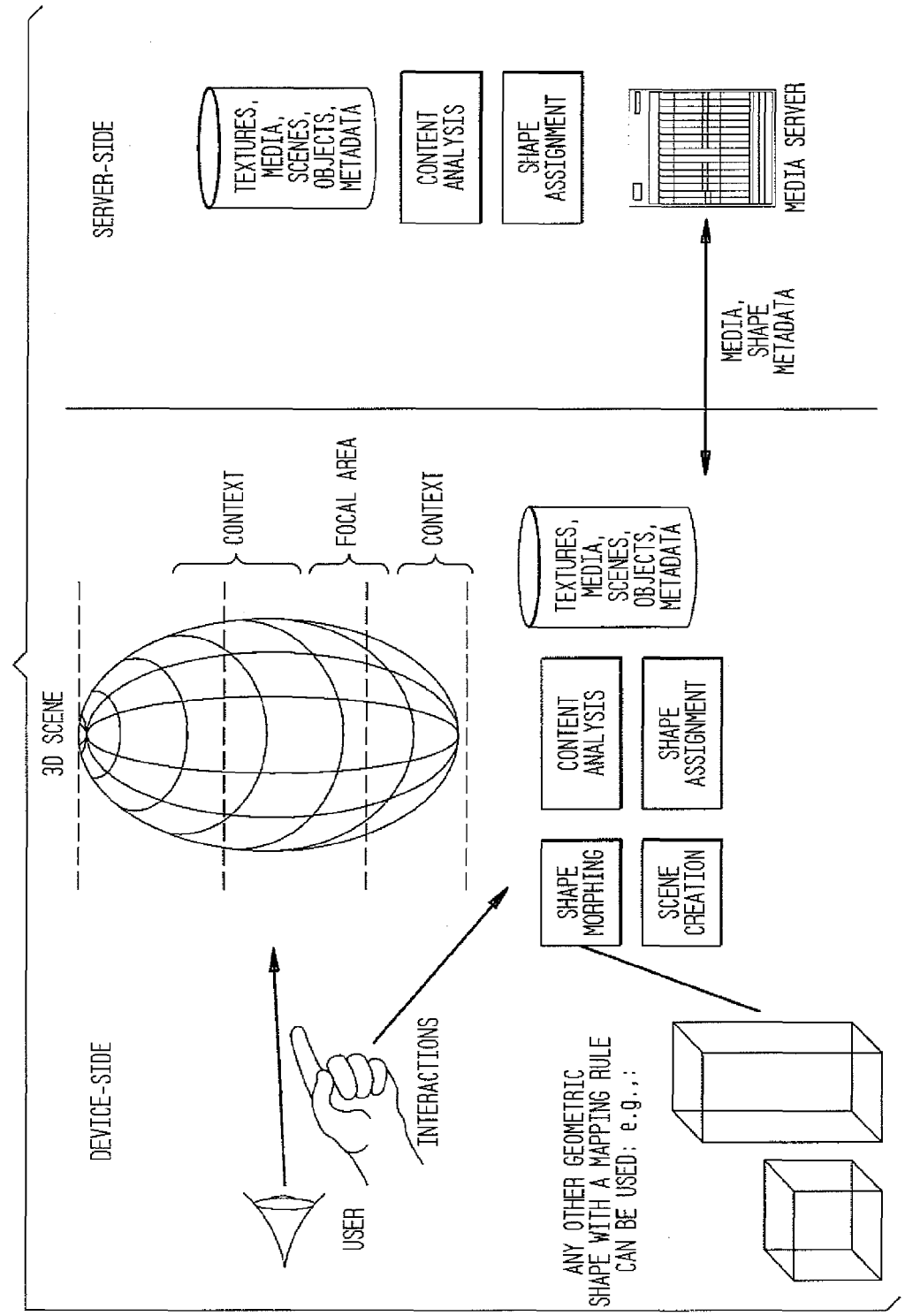
FIG. 4 shows another embodiment of the inventive system and method.

FIG. 4 shows another embodiment of the inventive system and method. As shown in FIG. 4, various functions can be used to display media content. The functions shown in FIG. 4 include shape morphing, scene creation, content analysis and shape assignment; additional functions can be included as needed. Shape morphing reshapes an object in the scene according to constraints with the effect of mapping facets from the original shape onto facets of the new shape in a 1-to-1, 1-to-many, many-to-1, or many-to-many relationship between original and new facets. Scene creation selects and instantiates a 3D scene for a skimming session based, optionally, upon the multimedia metadata (such as content type derived, optionally, by the Content analysis component) or required interaction options (i.e., some 3D scenes may be more appropriate when particular interactions by the user are required). Content analysis analyzes multimedia contents (optionally on the fly) and categorizes content into one or more categories known a priori (optionally associated with particular segments). This content analysis can make use of object recognition, heuristics, and other video analysis or machine vision methods in order to categorize or recognize the multimedia's attributes. Shape assignment understands content analysis as well as the semantic nature of shapes and applies a formula to attempt to choose a suitable 3D shape for a particular media that has been categorized. The Cache 24 can store data between sessions.

Figure 5:
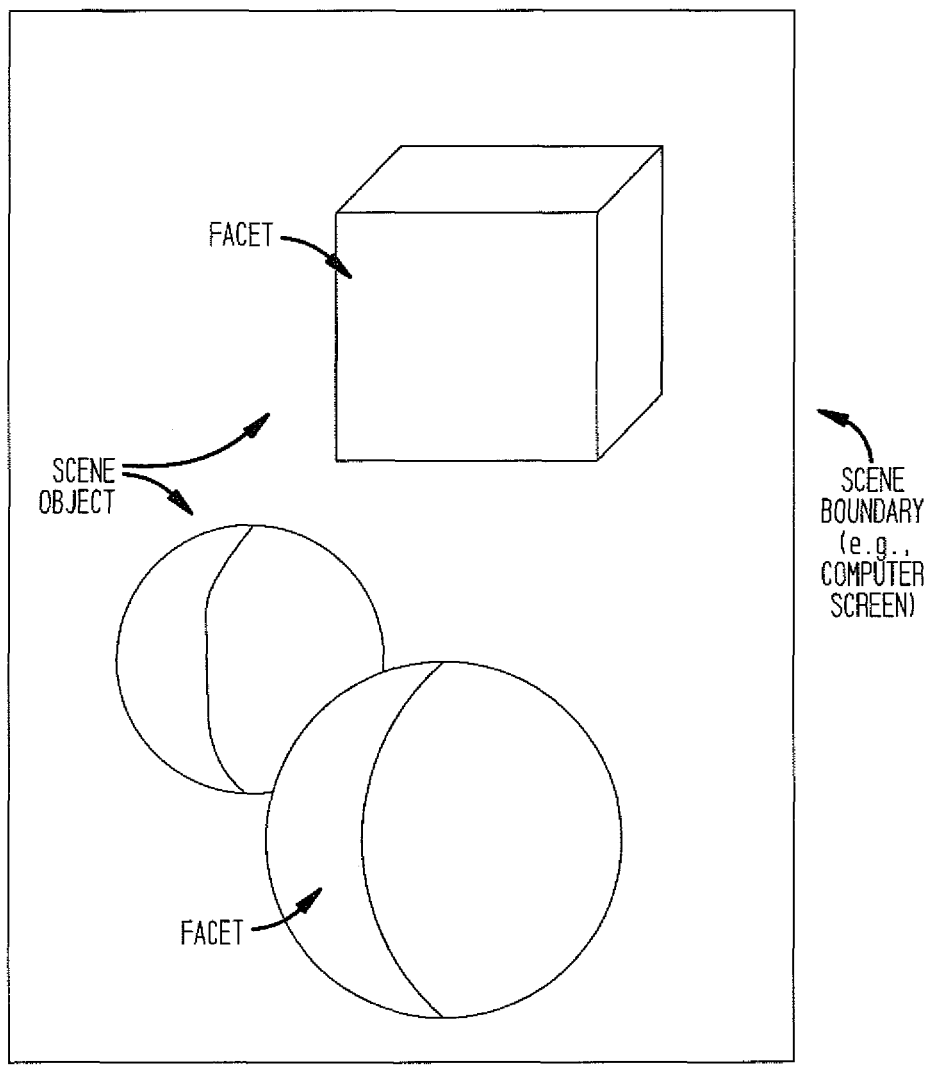
FIG. 5 illustrates a scene example.

FIG. 5 illustrates a scene example. The top portion of FIG. 5 shows a cube "scene object" in which each plane of the cube is recognized as a facet. The bottom portion of FIG. 5 shows two sphere "scene objects" whose surfaces are separated into two facets. Each shape's facets are correlated to the parent shape in a data structure. As shown in FIG. 5, both the cube and the spheres are displayed within the scene boundary, which in turn is presented on a suitable output device (e.g., a computer screen).

Figure 6:
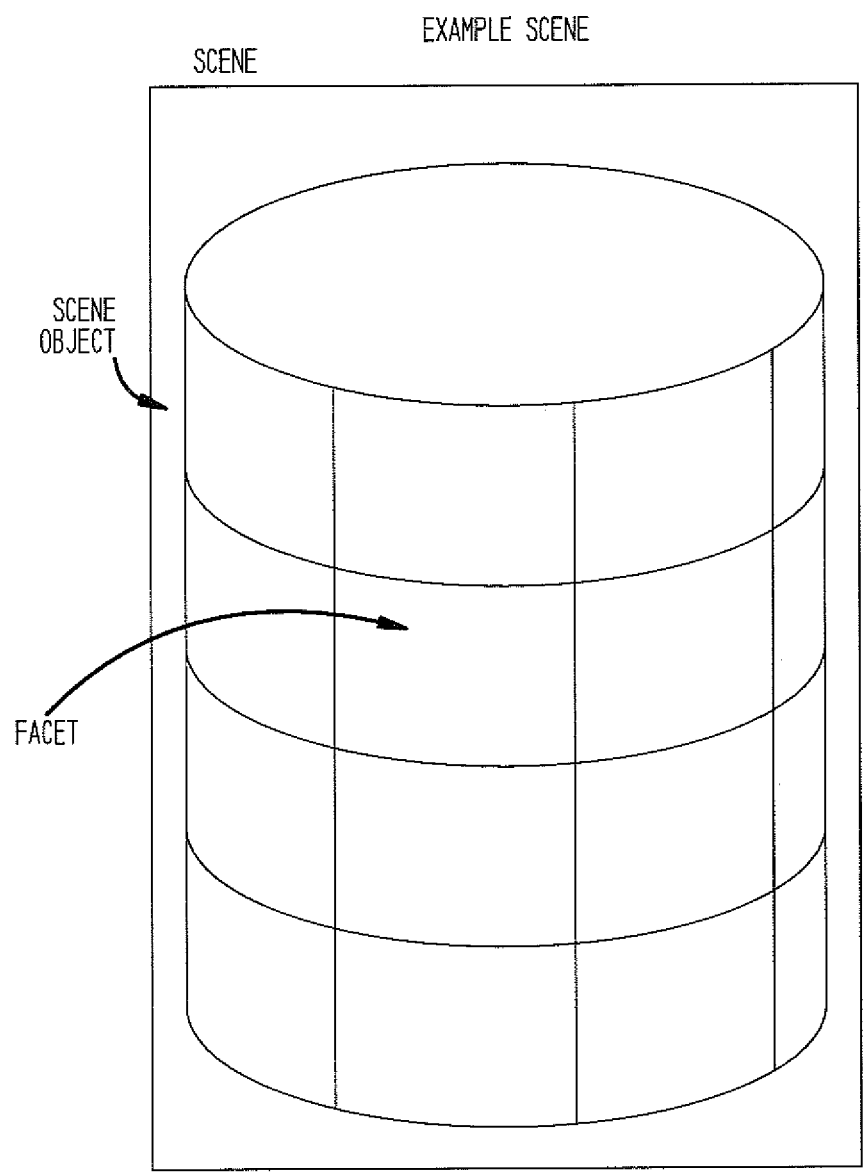
FIG. 6 is another scene example.

FIG. 6 illustrates another screen example, this example being a cylinder whose surface is divided into distinct facets. Logically, the facets have a relationship to the shape, and, for example, a separate video frame can be projected on each facet of the cylinder to correspond to a particular view within a skimming session. Such a session is likely to be comprised of several distinct views as described above.

In an exemplary embodiment, a user requests a media skim and/or search, e.g., of a video. The server 26 analyzes the request, including the user ID of the user making the request and the media metadata requested, in conjunction with the User Manager 16 and, if appropriate, with user information in the user database 30. The media can be classified into a particular category and then optionally matched with 3D objects and scenes that are suitable for the user and the media. The server responds to the user request with media segments and metadata comprising the 3D scene, object and interaction modes. Alternatively, the data is loaded from a local cache or from a number of other locally available or distributed systems.

Next, the device 10 creates the 3D scene in local memory for the purposes of display and manages media segments and other metadata, typically caching those items in a memory store or database. The device computes projections of media segments onto the surfaces of the 3D object(s) in a pre-specified or adaptive fashion. The device enables interaction with the 3D scene. Moreover, the 3D scene and/or objects may be adaptively modified during interaction sessions with the user by, for example, the addition of new 3D objects into the scene, the removal of objects, or the transformation of objects.

The rendering of the media into the 3D scene and the object facets therein will use ordering to distinctly separate "scene" ordering versus "scene action" details. Typically, these two aspects are mapped to distinct "dimensions" of the shapes and facets upon which they appear. In the scene dimension, scenes are ordered with respect to each other or to some unit, e.g., relative time in the media. For example, scene1 is ordered temporally before scene2 so it will appear before scene2 in the layout ordering as well. In the action dimension, action is laid out within a scene on a particular 3D path by using the facets that comprise the object in the scene on which it is being rendered. For example, on a sphere with facets as shown in figures described below, the scenes are ordered from the top of the shape downwards (each strip of frames is a scene) while the action may run 'around' the sphere in a particular direction, e.g., around the circumference.

Figure 7:
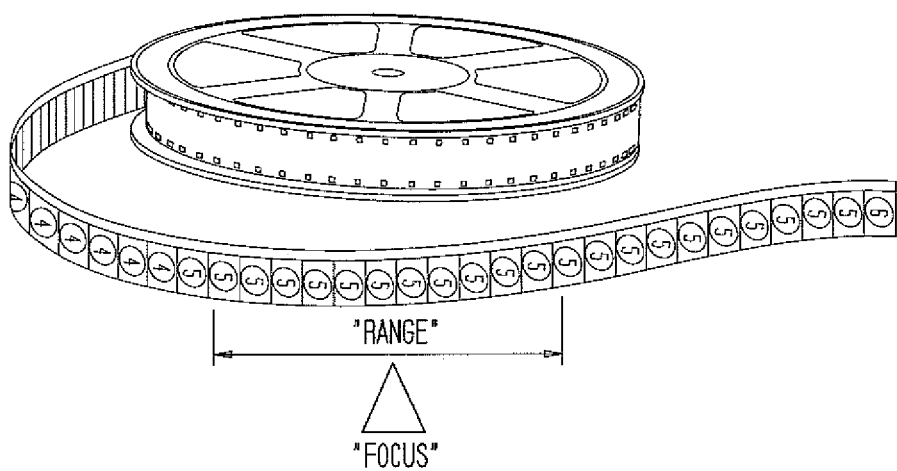
FIG. 7 shows a video media having a range of segments with a "focus".

The system can be configured such that it chooses a 3D scene and shape(s) and a mapping onto those shapes such that the view when viewed by a user provides a wide contextual view of the media as well as a focal area that can be seen somewhat more clearly. Such a metaphor mimics—in some regards—how the human visual perception system focuses on objects while still providing peripheral vision cues. FIG. 7 shows a video media in a skimming session having a range of segments with a "focus" or focal area, that is, specific portions, emphasized in detail. The system enables the non-linear adaptation of both range and focus values.

Typically the utilization of the visible surfaces of the objects in the 3D scene are used by the inventive program to provide a skimming experience to the user. The visible surfaces (composed of facets) of the 3D shapes in the scene on the client device are used opportunistically as "screens" for the projection media segments (such as video keyframes or clips). In another use case, both the visible and hidden surfaces of the 3D shapes are used as texture screens. The server or client/device specifies how media should be allocated across visible and hidden parts. The 3D scene is created, rendering segments onto both visible and, if applicable, hidden parts. The user is given an option to make hidden surfaces visible, e.g., prototypically, the inside surface of a hollow 3D shape such as a sphere is not visible initially. A user option allows the user to browse the media allocated to the inside of the shape, e.g., inside a sphere, cube, or any other shape. Optionally, upon request the system could exchange hidden parts for visible parts to toggle the view.

Possible uses of hidden surfaces can include using the inside surface of a 3D shape, and embedding another shape inside a first one and allowing skimming and/or searching into that interior shape (and possibly doing this recursively). Some examples of this include a plane inside a sphere that is only seen upon special input by the user, a sphere inside of a cube, and/or any shape in any other such that the primary shape is the one being examined initially but the inner shape contains additional information mapped onto its facets and can be viewed only when the virtual camera in the scene shows the user this inner shape.

Interaction between the server and the device can occur in various ways. In one embodiment, the server may send instructions in the metadata describing allowed or functional interaction capabilities and the device may enforce these. Alternatively this data may have been cached in the device at the client side, or any combination of local caching and remote networked information can be used. Exemplary interaction techniques can include gestures on the device touch screen or mouse interactions that may rotate, scale, or translate the scene or objects in the scene. In addition, gestures or other inputs on the device may change the virtual camera position in the scene such that it is more strategically placed; alternatively, the system may auto-position the camera to a preferred or optimal position. Also, gestures on the 3D scene may indicate interest or dis-interest in the media segments currently projected on that part of the scene. These gestures trigger further interaction and scene object-media re-assignment, e.g., user double-taps a scene of interest on one part of the media and the mapping of media segments onto the shape is updated by focusing in further on the scene of interest.

A variety of use cases or high level scenarios for media browsing are available in accordance with the present invention. One use case is media request, preparation and default presentation. In this case the invention performs the following. Receive a request to skim a particular media which is known to the system. Determine the 3D scene and shapes with facets best for this media. Determine parts of the media of most interest to the user, who may explicitly select or implicitly convey these parts. Determine the contextual parts of the media that support or comprise context or support to the most interesting part. The two aspects of a view are called "focus" and "context", which are illustrated in FIGS. 3 and 4. Creation of a texture bitmap that can be conveyed to the user's client device. The inventive technique re-shapes and re-assigns the 3D scene and object(s) such that the shape presents the "focus" area, e.g., area most interesting to user, in the part of the shape that is most applicable. For example, in a sphere, the central band can be the "focus", as shown in FIG. 3. In other words, the shape presents contextual media (that support or relate to the most interesting part) in the portion of the shape that is most applicable. For example, for a sphere, the bands running up and down the z-axis of the sphere can display the contextual media while taking advantage of natural foreshortening of the mapping of features onto these parts. Accordingly, focus is often shown on a prominent part of the sphere, e.g., keyframes [f1, f2], while context is everything else shown in the view from the current total range of view [r1, r2], where [f1,f2] is contained in the range [r1,r2]. Accordingly, the metadata required to reconstruct the initial view of the skimming session upon the 3D shapes in the scene is transmitted to the client device from which the user has requested the skim. Such metadata includes the bitmap texture file which when projected appropriately upon shape(s) provides a skimming view.

Hence, as part of media request, preparation and default presentation, the following activities also occur. The user examines the 3D shape and sees some media textures on a part of it of interest. The user rotates (or otherwise repositions) the shape so that the part of interest is more visible. The user selects or gestures upon, e.g., double-taps, etc., that part of interest using an input mechanism (such as screen taps or mouse selections). In response, the system correlates the selected facet(s) to a media segment and its position in the current range. The system determines the new range of view by dividing the current range into some subset where the selected segment is near the temporal or logical 'center' of that subset range. The system loads media segments according to the new subset from a server, or optionally from a cache. The system assigns and renders segments onto the 3D object(s) in the scene. As a result, the objects now encapsulate a "zoomed-in" view of the part of interest. In this use case the user continues to skim media by interacting through a series of distinct views, each of which is computed upon the current scene and its shapes as well as the current user preferences.

As an example of how the system responds to an interaction upon a media scene conveying interest, consider a range of view (ROV)=media segments 1-1000. The user touches a segment in a facet of the 3D shape corresponding to ROV 400-500. The system loads the detailed segments in the range 400-500 and spreads these across the entire 3D object. The system sets the focus of the current object to be the media segment. Therefore in this iteration the facets of the shape are reused to convey a smaller subset of ROV than the previous view and this process iterates. When ROV is continually decreased, we describe this as "zoom in", while when ROV is increased we describe it as "zoom out".

An exemplary method for mapping segments using a uniform sampling of media over a single dimension is presented. Initially, choose a shape dimension D upon which the media segments can be ordered, e.g., time for video frames. Determine the ordered set of facets on the target shape that can be assigned over this dimension (e.g., if the dimension is around the circumference of a sphere then the facets are those facets running around that dimension, e.g., around the circumference). Determine the part of interest (or segments) of the media required (this may be supplied in a query or may be a default). Determine a number n of samples needed to populate the chosen dimension on a shape. Sample the n media segments evenly (e.g., every frame, every $2^{nd}$ frame, every $3^{rd}$ frame, etc.) from the range of media segments that are of interest to the user. It may be necessary to choose additional segments for some available facets on a non-uniform basis, but only after the uniform approach has assigned a maximum of facets. If additional transformations are required either transform segments before they are composed into a texture or transform the texture after it is completed.

Another detail method for mapping segments using a non-uniform sampling of media is presented. This method employs a non-uniform segment choice and is the same as the uniform sampling method except that the n segments of the media are not chosen based on their numbering and relation to other segments (e.g., on a frame number basis) but on an independent basis such as hue/saturation, e.g., sample in order of saturation, camera action, e.g., prefer segments that correlate to camera actions such as cuts and pans, segments with particular user tags, e.g., segments that have been identified and tagged by users a priori.

Figure 8A:
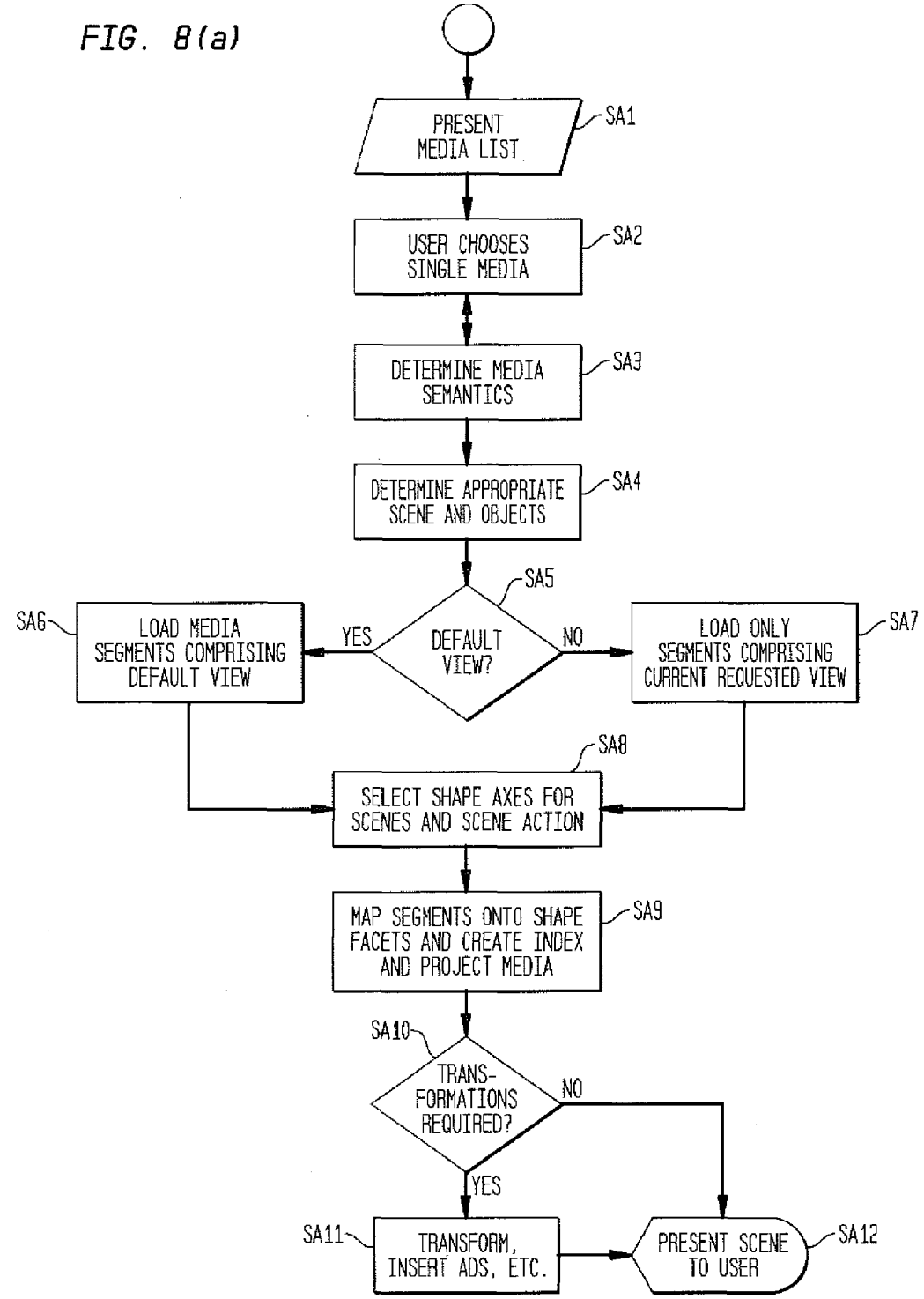
FIG. 8 shows a flow diagram of the media request, preparation and default presentation scenario.
Figure 8B:
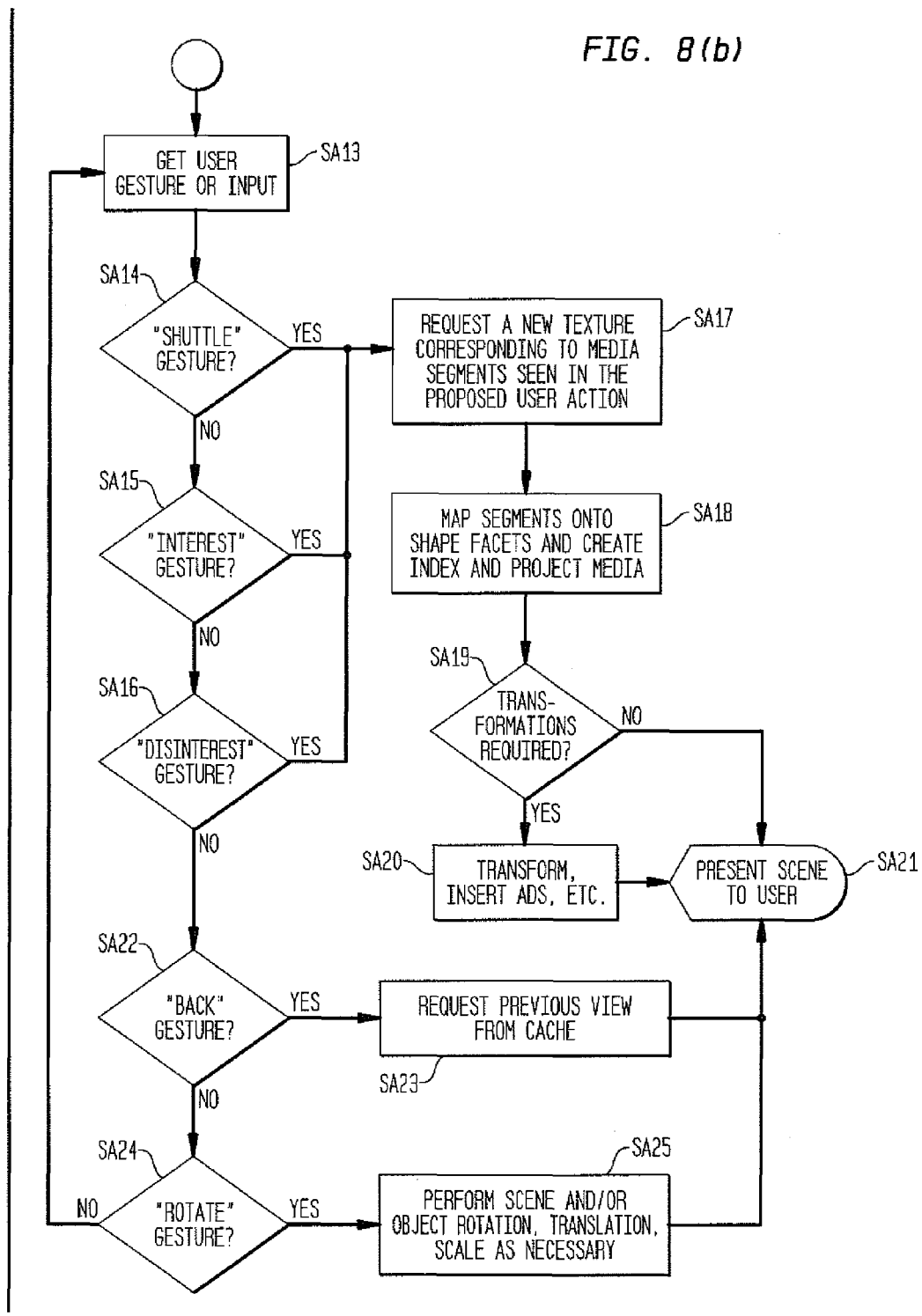

FIG. 8 shows the steps in this scenario. In step SA1, a media list is presented. In step SA2, the user chooses a single media. In step SA3, media semantics are determined. In step SA4, appropriate scene and objects are determined. In step SA5, whether the default view is requested is determined; if SA5=YES, default view is used, and in step SA6, the media segments comprising default view are loaded, and processing continues at step SA9.

Otherwise, if SA5=NO, in step SA7 only segments comprising current requested view are loaded. In step SA8, shape axes for scenes and scene action are selected.

In step SA9, segments are mapped onto shape facets, and an index and project media are created. In step SA10, whether transformations are required is determined; if transformations are required (SA10=YES), then in step SA11, transformations are performed, ads can be inserted, etc. Next, and if transformations are not required (SA10=NO), the scene is presented to the user in step SA12.

Further, in step SA13, user gesture or input is obtained. If the gesture is "shuttle", (SA14=YES), or the gesture is "interest" (SA15=YES), or the gesture is "disinterest" (SA16=YES), then in step SA17, a new texture is requested corresponding to media segments seen in the proposed user action. In step SA18, segments are mapped onto shape facets and index and project media are created. In step SA19, whether transformations are required is determined; if transformations are required (SA19=YES), then in step SA20, transformations are performed, ads can be inserted, etc. Next, and if transformations are not required (SA19=NO), the scene is presented to the user in step SA21.

Alternatively, when gesture is none of "shuttle" (SA14=NO), "interest" (SA15=NO), "disinterest" (SA16=NO), it is determined whether the gesture is "back"; if so (SA22=YES), then in step SA23, the previous view from the cache is requested. Processing continues at step SA21.

If the gesture is not "back" (SA23=NO), it is determined whether the gesture is "rotate"; if so (SA24=YES), then in step SA25, perform scene and/or object rotation, translation, scale as necessary. Processing continues at step SA21.

Figure 9:
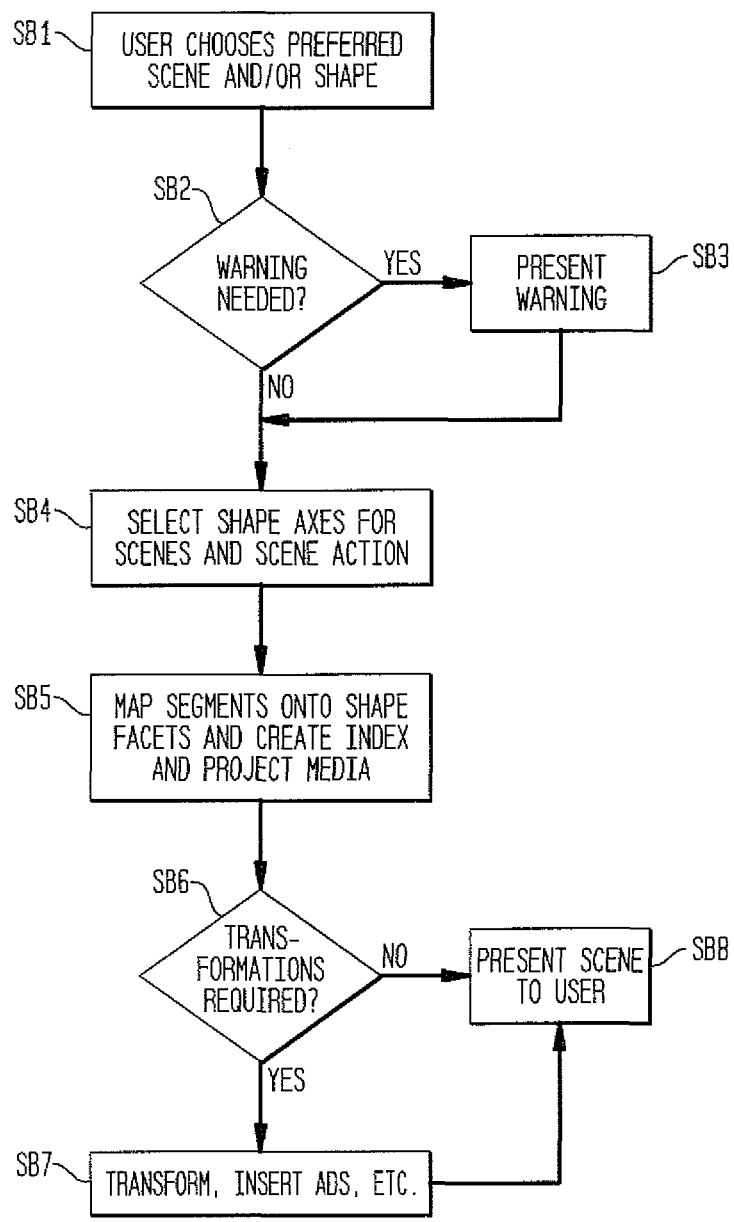
FIG. 9 shows a flow diagram of a scenario with a scene and object customization by the user.

Scenario B is scene and object customization and ads incorporated into the presentation, including both user and system-based scene selection. FIG. 9 is a flow diagram of the steps of user scene selection. In step SB1, the user chooses preferred scene and/or shapes. In step SB2, whether a warning is needed is determined. If a warning is needed (SB2=YES), then the warning is presented in step SB3. Next, and if no warning is needed (SB2=NO), in step SB4, shape axes for scenes and scene action are selected. In step SB5, segments are mapped onto shape facets and index and project media are created. In step SB6, whether transformations are required is determined; if transformations are required (SB6=YES), then in step SB7, transformations are performed, ads can be inserted, etc. Next, and if transformations are not required (SB6=NO), the scene is presented to the user in step SB8.

Figure 10:
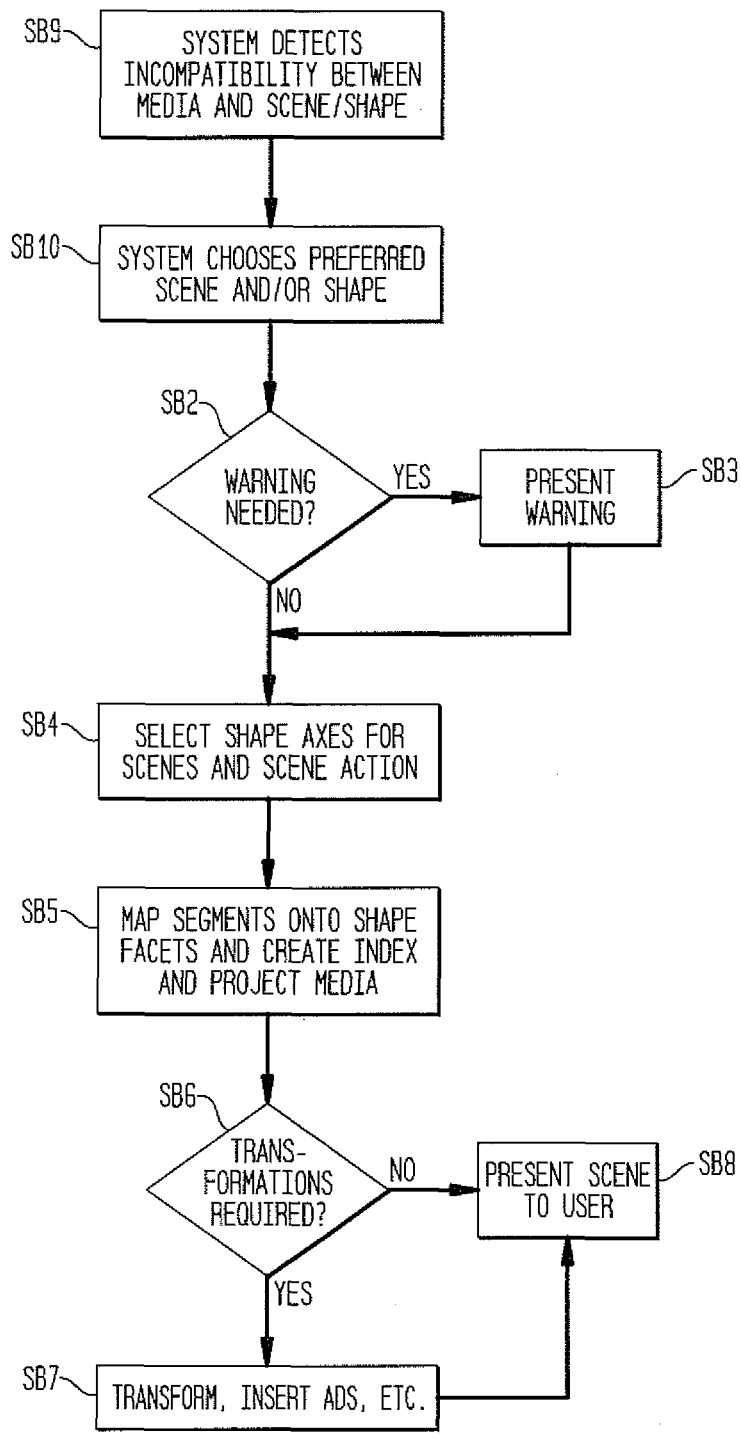
FIG. 10 shows flow diagram of a scenario with a scene and object customization by the system.

FIG. 10 is a flow diagram of Scenario B, system-based selection. In step SB9, the system detects incompatibility between media and scene/shape. In step SB10, the system chooses a preferred scene and/or shape(s). The process then continues with steps SB2-SB8, as described above for the user scene selection.

Scenario C is scene interaction in which the user explores the scene, including rotating scene objects, changing virtual camera perspective, playing back, etc. This scenario includes object selection, facet selection, and playback of both low and high resolution multimedia. The scenario includes a preview option in which the user requests a preview of the temporal-based media, e.g., video. The system moves one or more 3D scene object(s) in an automatic way and at a rate such that the effect of the movement is that the user perceives multimedia action upon the surface of the object (due, in part, to so-called persistence of vision). In a prototypical example, an object with several facets is rotated in front of the virtual camera, sequentially and rapidly exposing the facets to the user. The rotation effect is optionally controlled by user gestures or interactions.

The scenario also includes the ability to playback in full, in which the user requests full playback of the media in question, e.g., media currently represented in the 3D scene. The system makes use of media metadata to determine how best to playback the media in highest definition. In one approach, the system launches a secondary independent application which has been registered to support such playback (e.g., a YouTube application is launched in a Web Browser application with the information required for it to playback the media in question in its application space). The media is therefore played out in high definition in a separate application. Optionally, the media is played back in high definition upon the surface of one or more 3D objects in the scene, if the device can support such playback.

Figure 11:
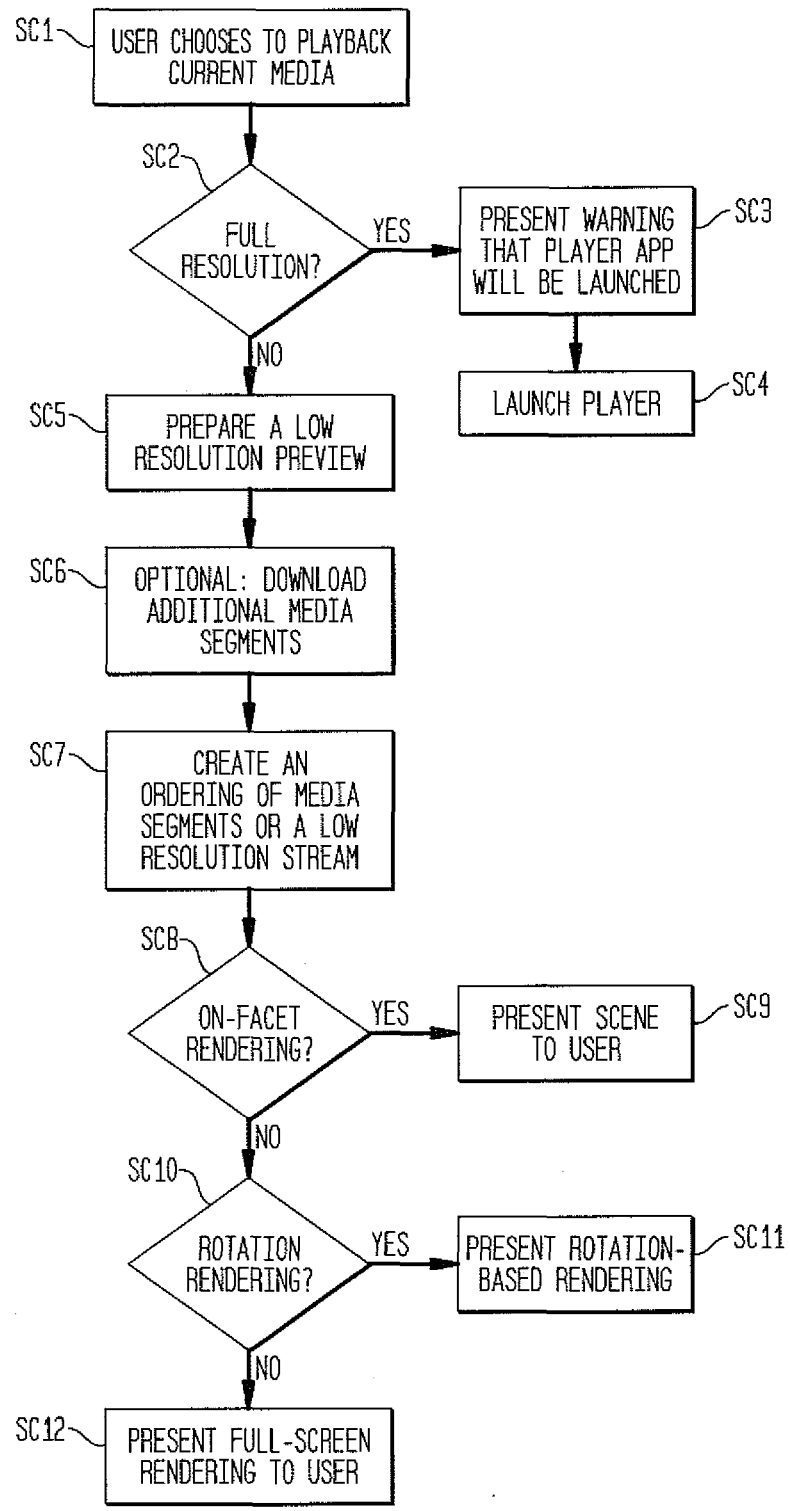
FIG. 11 is a flow diagram of the playback option.

FIG. 11 is a flow diagram of the playback option of Scenario C. In step SC1, the user chooses to playback current media. In step SC2, whether full resolution is desired is determined. If full resolution is requested (SC2=YES), in step SC3 a warning is presented that a player application is launching. The player application is launched in step SC4.

Otherwise, if full resolution is not requested (SC2=NO), then in step SC5 a low resolution preview is prepared. In step SC6, additional media segments can be downloaded, if desired. In step SC7, an ordering of media segments or a low resolution stream is created. In step SC8, whether on-facet rendering is desired is determined. If on-facet rendering is requested (SC8=YES), then in step SC9, facet-rendering is presented. In on-facet rendering, the preview renders one or more of the shapes in the scene directly upon the shape surface and contours the shape(s) to match the surface or facet upon which it is rendered.

Otherwise, if on-facet rendering is not requested (SC8=NO), then whether rotation rendering is desired is determined in step SC10. If rotation rendering is requested (SC10=YES), then rotation-based rendering is presented to the user in step SC11. In rotation-based rendering, the preview is generated by continually rotating a particular shape and ensuring that consecutive media segments pass in front of the virtual camera. The effect of this is similar to a praxinoscope.

Otherwise, if rotation rendering is not requested (SC10=NO), then full-screen rendering is presented to the user in step SC12. In full-screen rendering, the preview takes up most of the screen on a 2D plane directly in front of the virtual camera. The frames change intermittently to create the effect.

Scenario D is scene adaptation in which the user is interacting and changing shape(s) to better convey visualization. This scenario includes shapes and relationships among them, in which 3D scene and objects adapt to the user. When the user's interactions with particular aspects of the media or interface metaphor meet or exceed thresholds, the system may modify the scene presented in the interface. In the alternative, the system can be told explicitly about the user's mode. The system can adapt by providing more individual shape regions to be used on which media can be mapped, but fewer media segments can be used in each region. Another adaptation can be one in which fewer shape regions will be presented but more frames in each region will be used. Moving the virtual camera or perspective is another adaptation, as is making hidden surfaces visible, or any other spatially based adaptation not limited to the ones described here.

The result of this adaptation, e.g., these changes, is that the 3D objects in the scene are re-allocated media segments and therefore their role in the visual skimming process is modified. Specifically, the scene is modified and media segments are reassigned and redrawn dynamically upon the objects. The user's skim and/or search session continues in the new modified scene. A scene-modification component determines the best way to adapt the interface, including one or more of the following adaptations: optimize pixel use, enhance or accentuate the semantic of the media content, meet a preference of the particular user, and/or some hybrid or other approach.

As an example, the scene-modification component may transform the current 3D objects on the client device so that the user has a better viewing vantage point, e.g., transforming a cube along the z-axis to become a rectangle, transforming a sphere into a cylinder, changing the perspective/virtual camera position, making hidden surfaces visible, and so on. Accordingly, a library of metadata about 3D shapes can be annotated with information such as degree of suitability for projection upon its facets, and/or suitability for various types of contents (e.g., sports vs. news) and then can be called upon to provide a suggestion for an alternative 3D shape for transforming a skimming scene.

A formula for scoring a particular shape for a particular video is:

$$S=(shape\_suitability*shape\_factor+ media\_type*content\_factor+ user\_pref*user\_factor)/3$$

where:
shape_suitability is an a priori rating of a shape, e.g., of a sphere, for its use in a 3D scene for projection
media_type is a factor that rates different content types, e.g., sports, news, etc., to their suitability to projection and is a function of the shape
user_pref is a factor relating to a user preference for shape
shape_factor, content_factor, and user_factor are constants appropriately set for a given situation.

The result S is a weighted rating of the appropriateness of a given shape for a given media and a given user. When the system is choosing between shapes to use within skimming sessions of a given media the S values (as above) can be compared and the shape with highest S value can be chosen.

Figure 12:
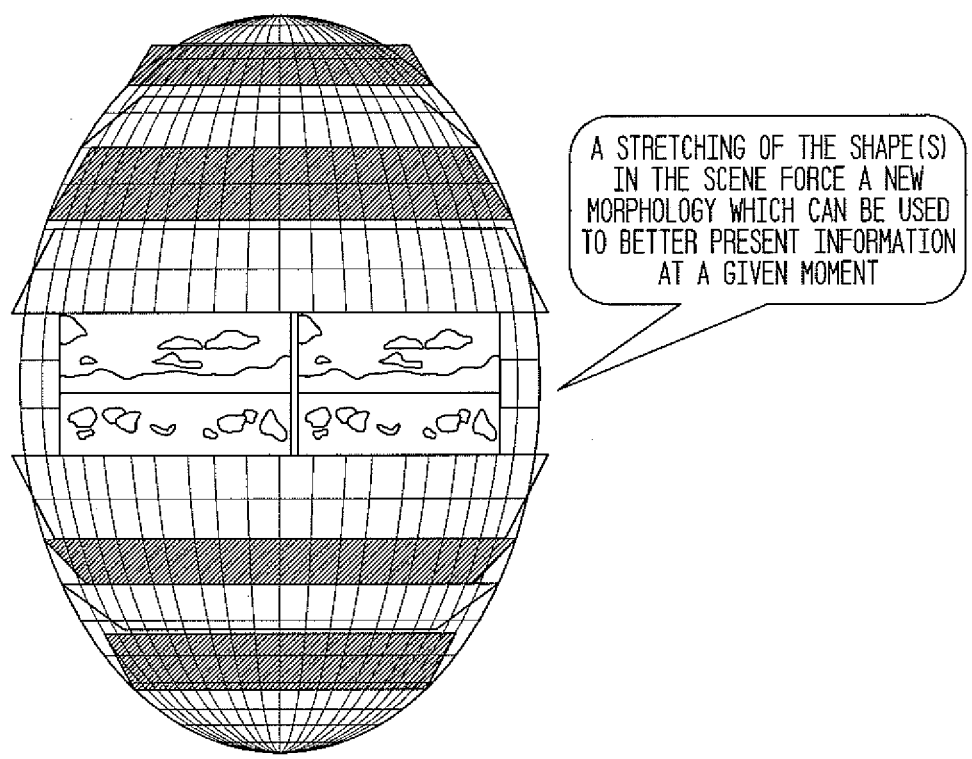
FIG. 12 illustrates one type of adaptation.

FIG. 12 illustrates one type of adaptation. During the course of skimming with the system, the user might prefer to change the orientation of her device (e.g., mobile phone or tablet). Then, in the case of a spherical object in the scene, the sphere will automatically switch to a mode in which the 3D scene adapts to best suit the screen proportion. For example, in the case of a sphere, the sphere might be transformed (stretched) in the vertical dimension and will have more bands but each band has fewer frames presented. Optionally, the system may switch to such a mode automatically when the results are anticipated to help the user better find information. In order to perform this, the system would first catch the screen orientation notice (system-level), then compare the orientation mode to the factors of the current 3D scene and objects, then determine if a transformation of the current shape is possible and desired by the user, and perform the transformation optionally requesting a new updated texture from a server.

Figure 13:
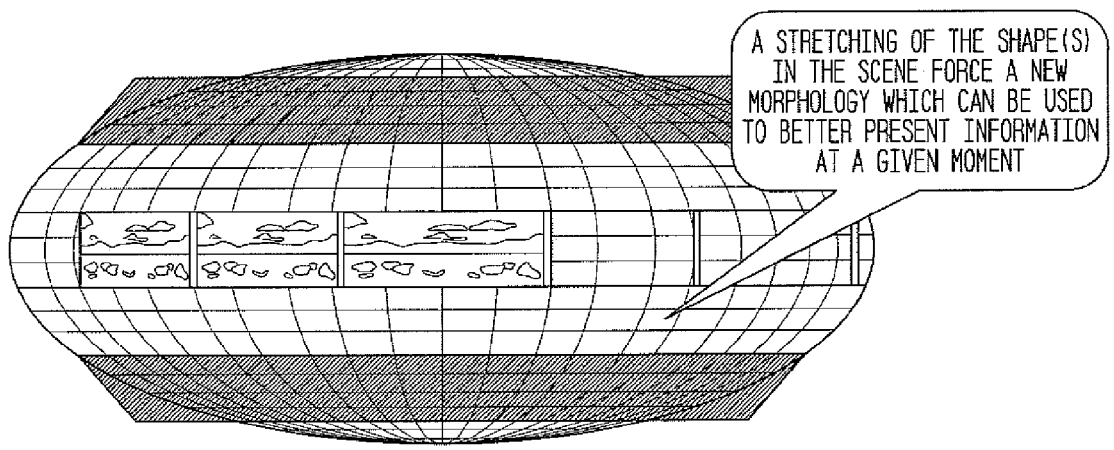
FIG. 13 illustrates another type of adaptation.

FIG. 13 illustrates another type of adaptation. When the user wants to see more about the individual scene and in the meantime, he still wants to see other scenes close by, he can hold his device horizontally, e.g., in landscape mode. Then the sphere will automatically change its layout to contain fewer bands, but more frames in each band. This process is similar to the above process.

Figure 14:
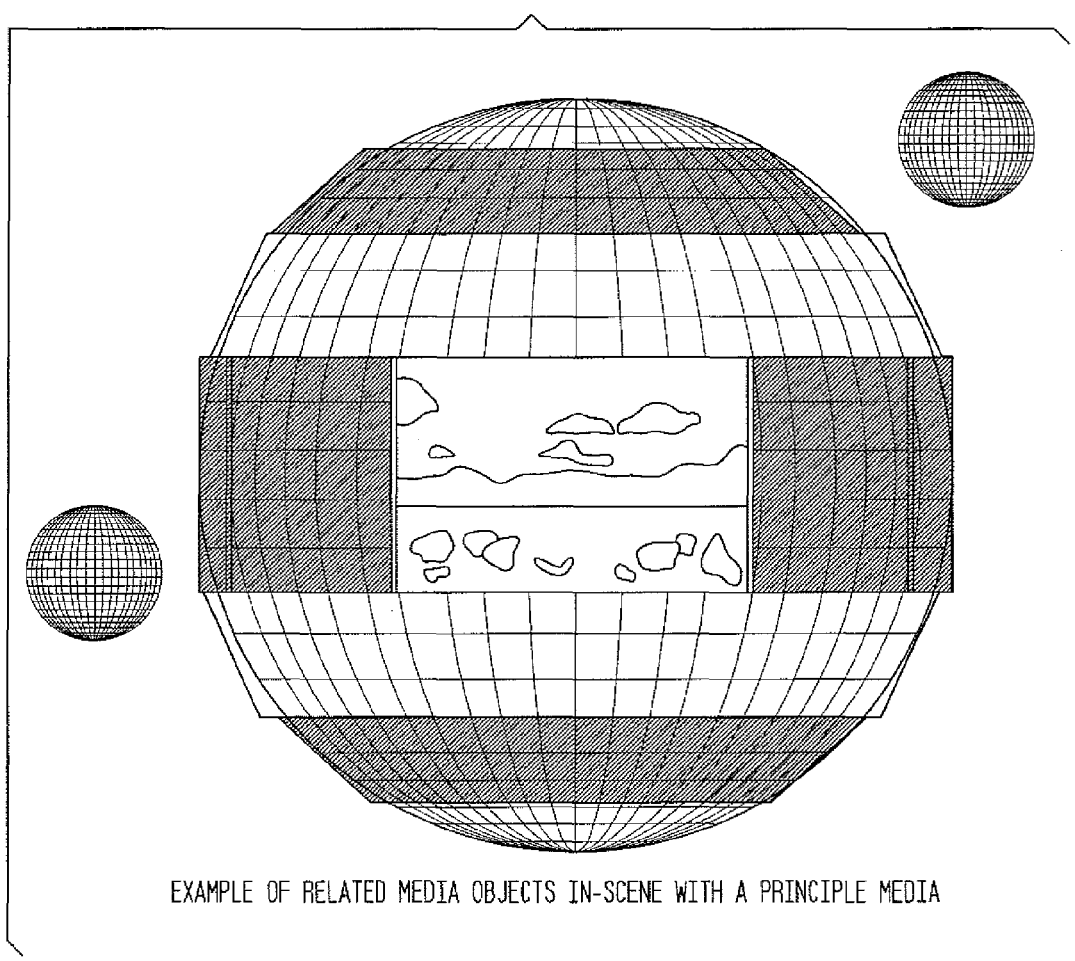
FIG. 14 shows an example of related media objects in-scene with a principle media.

FIG. 14 shows an adaptation in which a set S of related media objects are computed and then displayed within the 3D scene together with the principle media. Such a view can be requested by the user directly or provided opportunistically by the system according to some heuristics or logic. When this view is to be presented, the system first analyzes the current media metadata and then either compares it to other media metadata it may have stored in order to build a set S of media that are related to the current media, or requests that an external system perform the analysis and set creation. Upon completion of the creation of set S, the current 3D scene is examined and new objects are created in the current scene, one object for each of the related items in S. Keyframes and/or other metadata can be used as a texture for this media. These additions to the scene comprise a new kind of view, useful to the user, and the view lasts only until the user chooses to dismiss it or to select one newly added object to change the skimming session.

As an example, for each video media in the set S determined to be relevant to the principle media, choose two keyframes to use as textures and, in the case of 3D sphere objects, split the sphere along the z-axis into two 'halves' and render each keyframe onto a half. Position and scale each new object relative to each other such that the volume, size, color, shape, or other aspect conveys the relative 'related-ness' to the main media.

For instance, when the 3D scene is comprised of a sphere-like object, the related media are assigned to smaller spheres which are then positioned around the main sphere as in an 'orbit'. The spatial relationship between the objects is intended to help convey related-ness or semantic connectedness. For example, the relative distance between each sphere corresponding to a related media and the current media could be proportional to its "relationship" factor (computed above). Interaction with the new scene is allowed. Optionally, incorporating related media can begin a pre-scripted scene animation that accentuates the related media, their positioning, and so on.

Figure 15:
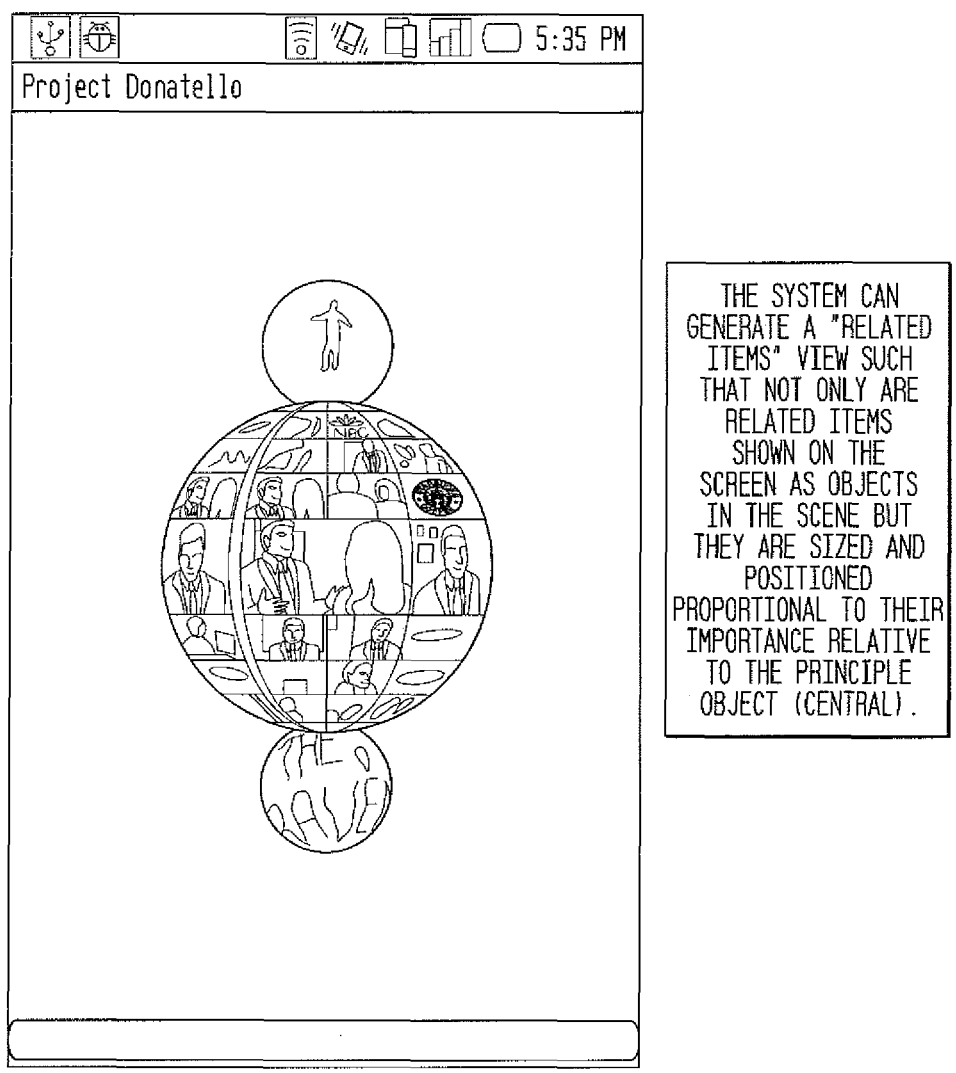
FIG. 15 shows another example of related media objects in-scene with principle media.

FIG. 15 shows another example of related media objects in-scene with principle media. As shown in FIG. 15, a scene is displayed in the center of the circumference of the sphere and two additional spheres are displayed, one to the upper left of the main sphere and the other to the lower right. Such a view is created by the system to visualize multimedia related to the current media in a pleasing and consistent manner.

In one embodiment a "concentration mode" can be enabled within the skimming session to assist the user to focus attention on parts of the 3D shapes of interest and/or most useful and presents some contextual information such as links to related media or advertisements, and blocks out—partially or in full—parts of the 3D scene considered "visual overhead" (or extran. Therefore, this mode allows the user to concentrate more fully on the facets of most usefulness while still understanding the containing shape as a whole. This mode can be triggered explicitly by the user, or automatically when the user spends an amount of time exceeding a threshold on a given view.

For example, a user explicitly selects the "concentration mode" for the current view. The system creates a semi-transparent pane that at least partially obscures much of the contextual information that may be distracting the user in the current view on the 3D scene. The system may limit the kinds of interactions that can occur in this mode, e.g., disables camera movement gestures. The system shows the 'shield' which partially or fully restricts view into the 3D scene. Optionally the 3D scene or object(s) move automatically in ways that help the user to view the information without distraction. For example, the object can move in a slow constant rotation. Optionally, the 'shield' has some information or links that are generated by the system or from a remote server that allow further exploration, details, or advertisement. The user ends 'concentration' mode explicitly and shield object(s) disappear. Optionally, the system automatically removes the shield when the user's interactions indicate that the exploration mode should be more broad.

Figure 16:
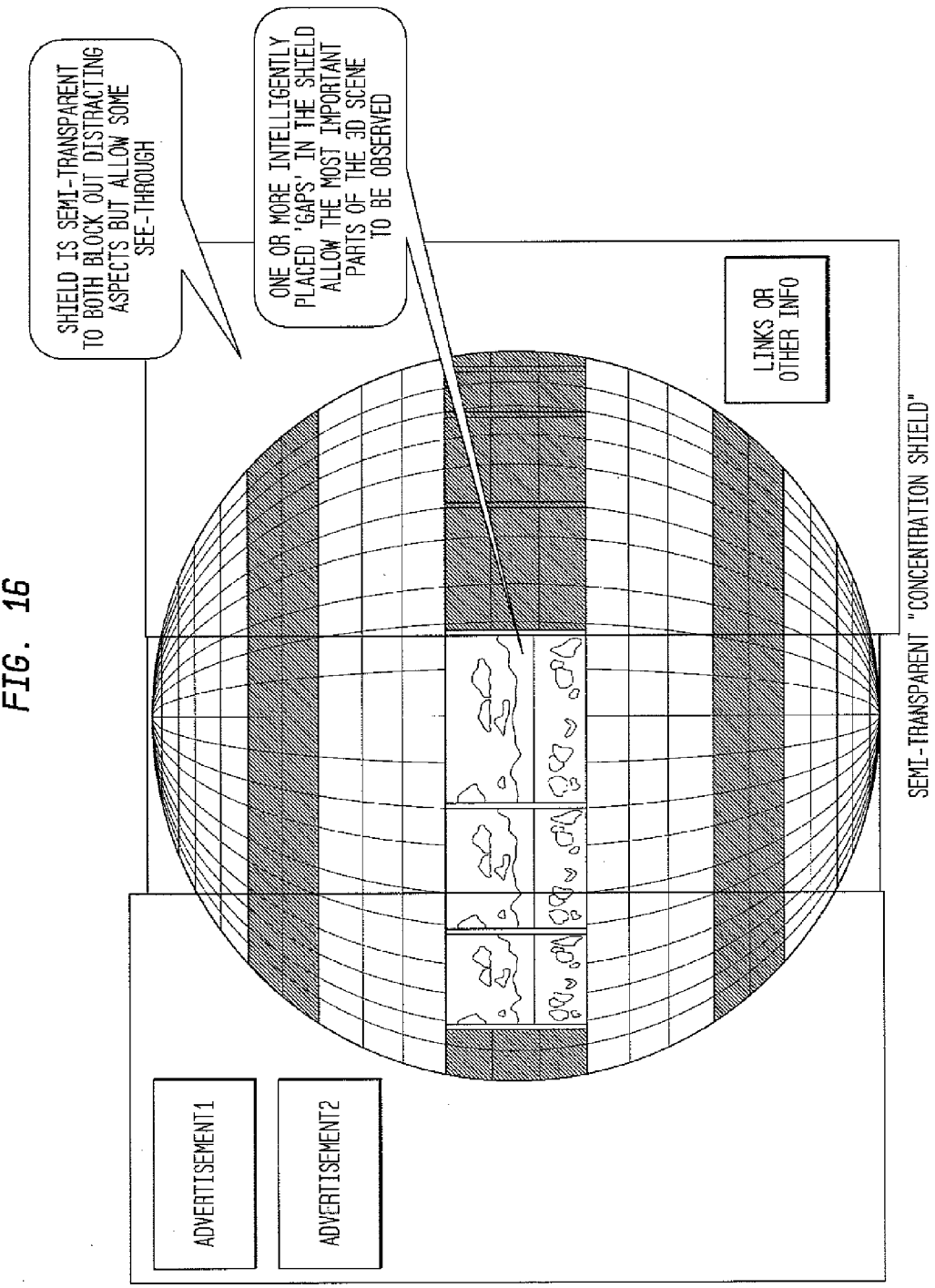
FIG. 16 illustrates a semi-transparent "concentration shield" on the sphere.

FIG. 16 illustrates a semi-transparent concentration shield (Shield) on the sphere. Ads can be placed on the shield, in addition to, or instead of on the sphere. The Shield is semi-transparent to both block out distracting aspects and to allow some see-through. One or more intelligently placed "gaps" in the shield allow the most important parts of the 3D scene to be observed. Links and/or other information can also be placed on the shield.

The system maintains a data structure that associates the media and the facets of the 3D object(s) and scenes. An example of a relational table that demonstrates how 3D scenes contain shapes can include fields of Scene, Shape ID, Shape part ID, Type, Facet ID, Media segment ID and Transformation (rotation, translation, scale). Each shape is comprised of parts, facets, and has a transformation. Each facet or part is associated with a media segment, e.g., a keyframe.

Figure 17:
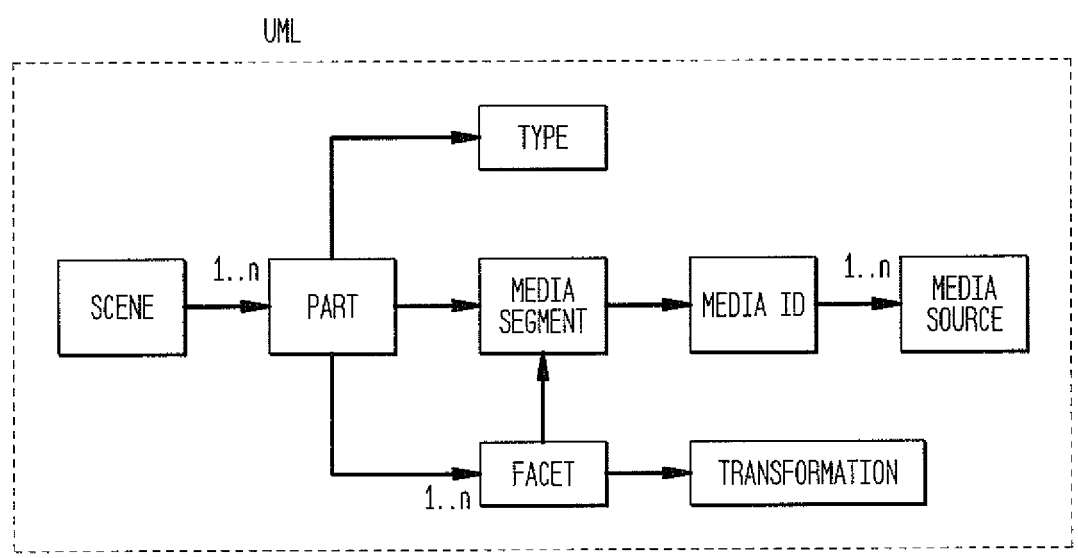
FIG. 17 is a UML logical diagram.

FIG. 17 is a UML logical diagram that shows how logical system entities would be associated. A Scene is associated with 1 . . . n parts. Each part is associated with a type, a media segment and 1 . . . n facet(s). A facet is also associated with a media segment and a transformation. A media segment is associated with a media ID and 1 . . . n media source(s).

Figure 18:
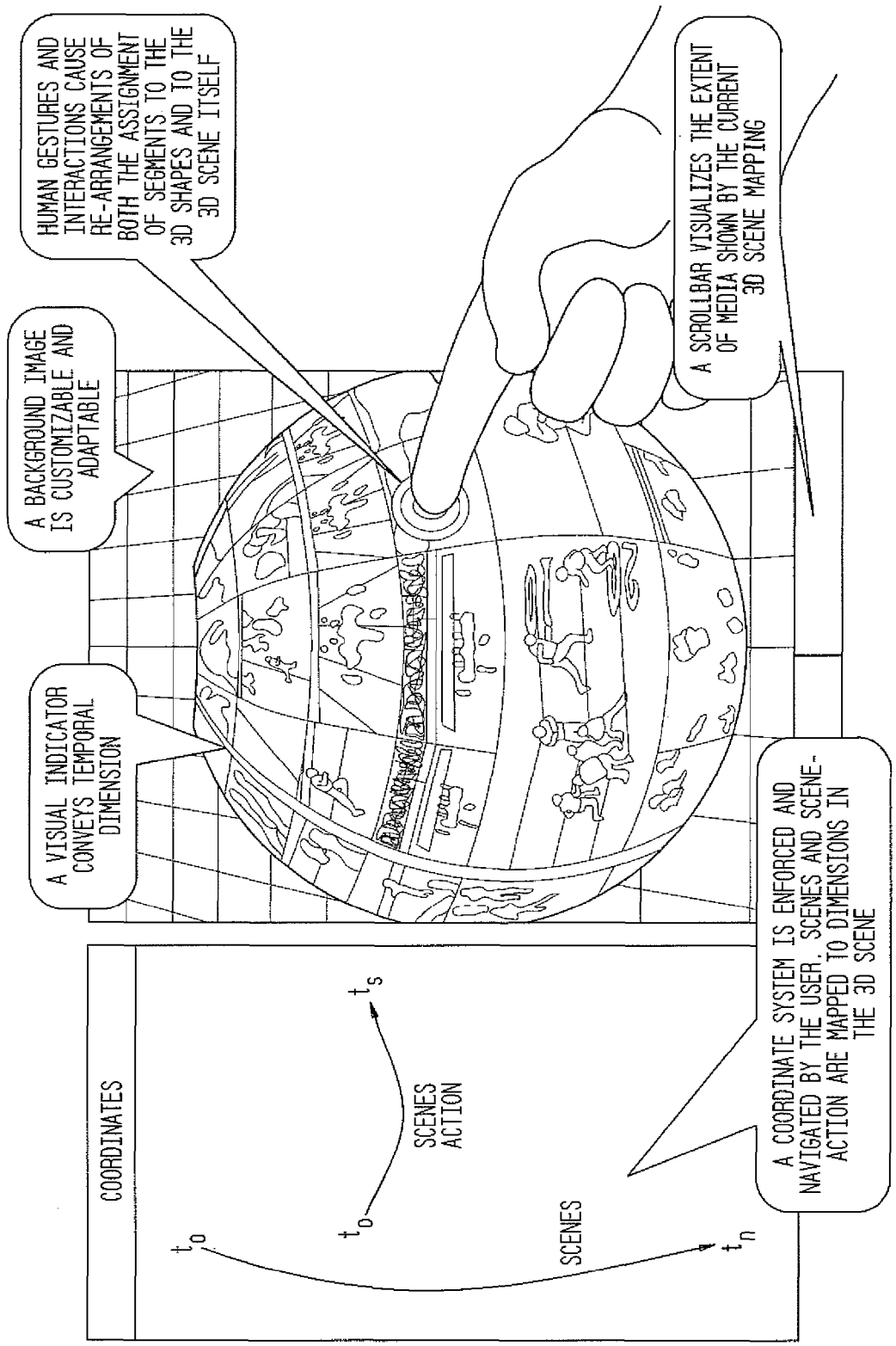
FIG. 18 illustrates an embodiment of the inventive system.

FIG. 18 illustrates an embodiment of the system. FIG. 18 explains, on the left, the coordinates of the scenes from top to bottom, e.g., $t_0$ to $t_n$, as well as the coordinates of scene action from left to right, e.g., $t_0$ to $t_s$. The coordinate system is the basis for texture layout on the 3D shape and benefits the user in the skimming session. Scenes and scene action are mapped to dimensions in the 3D scene objects. A scroll bar along the bottom of the display screen visualizes the extent of media shown by the current view (for example, in time-ordered video frames the user may be zooming-in to a small subset of them—this is indicated via the scrollbar and stroller thumb). A visual indicator conveys temporal dimension and a background image is customizable and adaptable. User gestures and interactions cause re-arrangements of both the assignment of segments to the 3D shapes and to the 3D scene itself.

Figure 19:
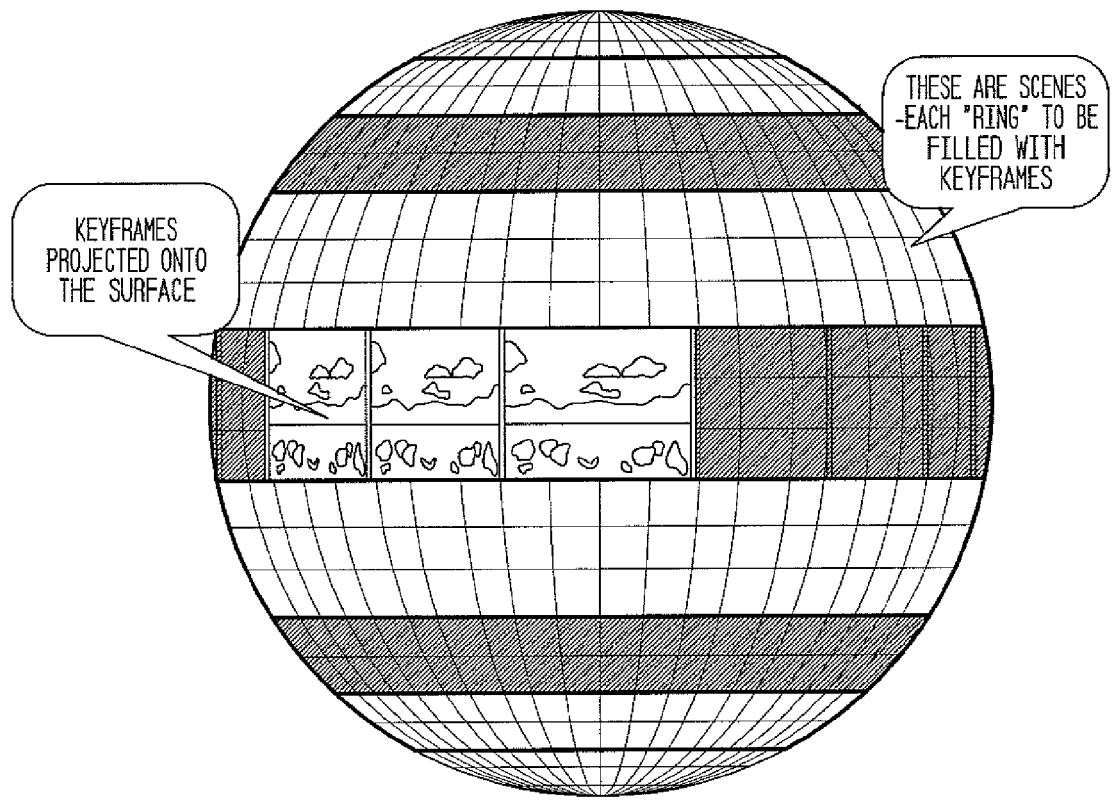
FIG. 19 shows a sphere with keyframes projected onto the surface at the circumference.

FIGS. 19-25 illustrate screen displays in accordance with the invention. FIG. 19 shows a sphere with video keyframes projected onto the surface at the circumference or central area. Additional scenes, seen as rings around the sphere mapped onto facets, are filled with video keyframes. All bands would be filled with media segment keyframes as in the central area.

Figure 20:
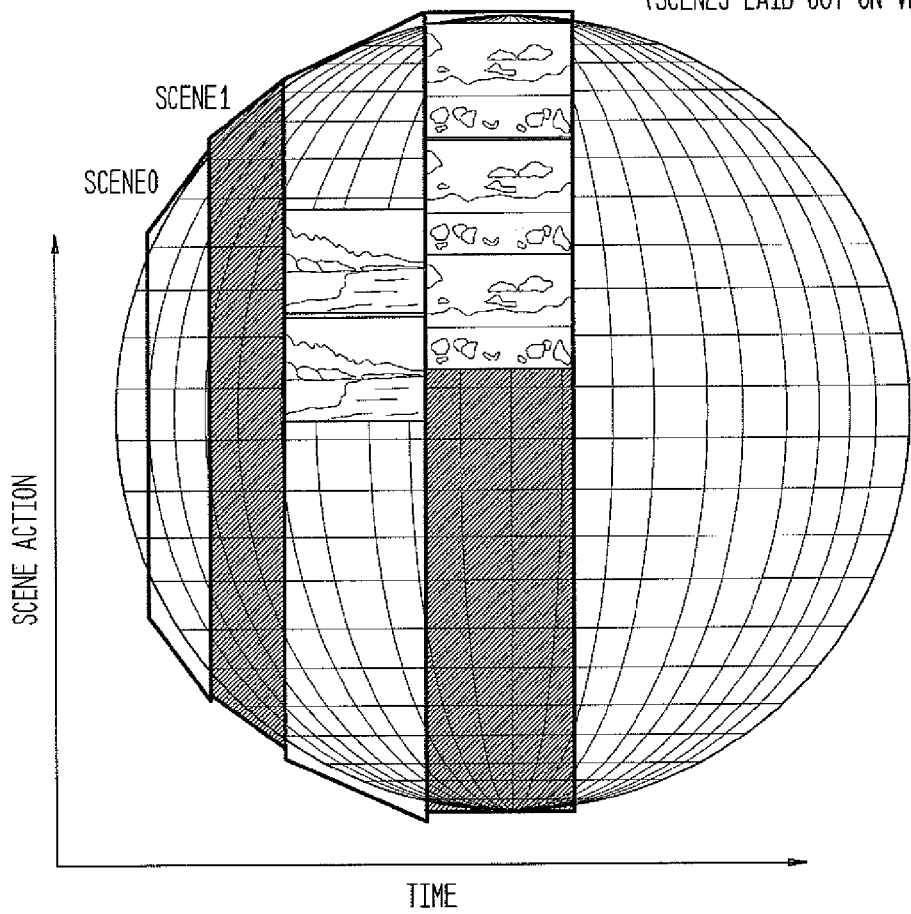
FIG. 20 illustrates an alternate layout in which the scenes are laid out on vertical strips.

FIG. 20 illustrates an alternate layout in which the scenes are laid out on vertical strips. The scene action is displayed from bottom to top while the time is displayed from left to right as in FIG. 13.

Figure 21:
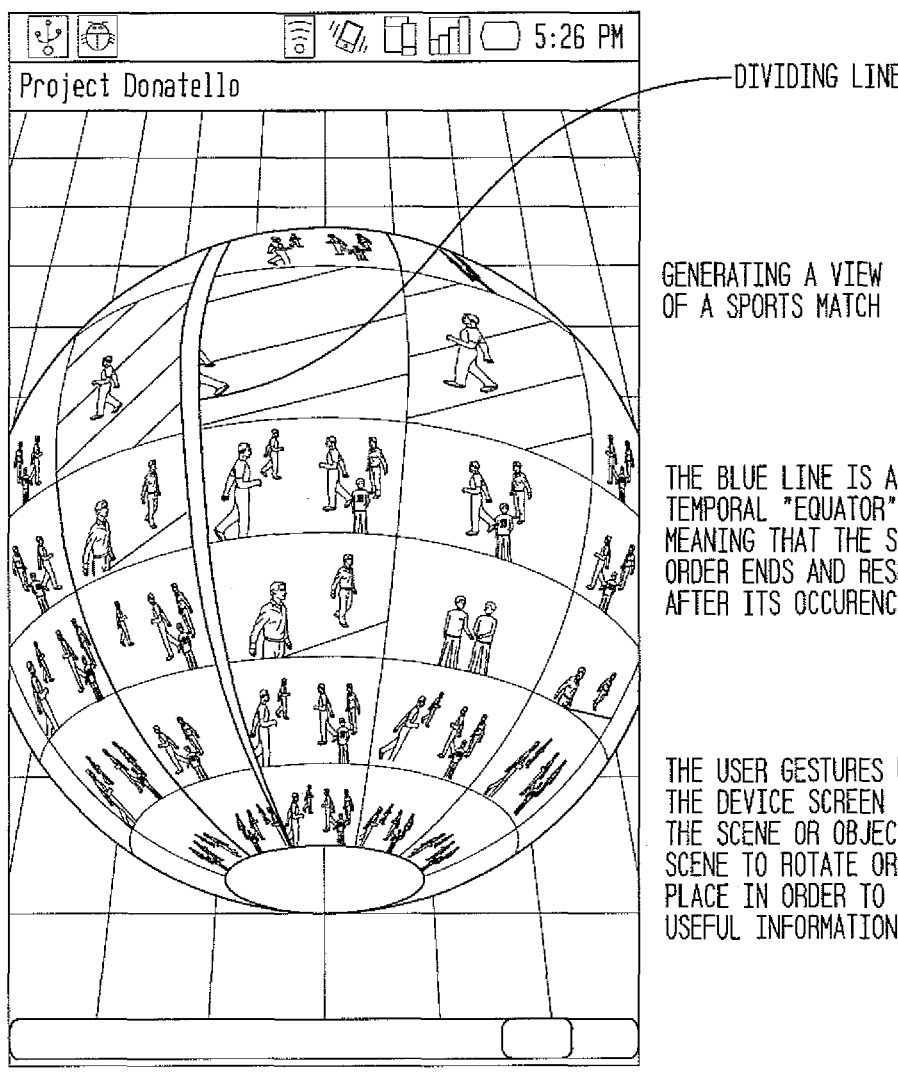
FIG. 21 shows an embodiment generating a view of a sports match.

FIG. 21 shows generating a view of a sports match. The "dividing" line is a temporal "equator" meaning that the sequential order ends and resets after its occurrence. The user gestures upon the device screen to cause the scene or objects in the scene to rotate, scale, or translate in order to show additional information useful for the skimming or search session.

Figure 22:
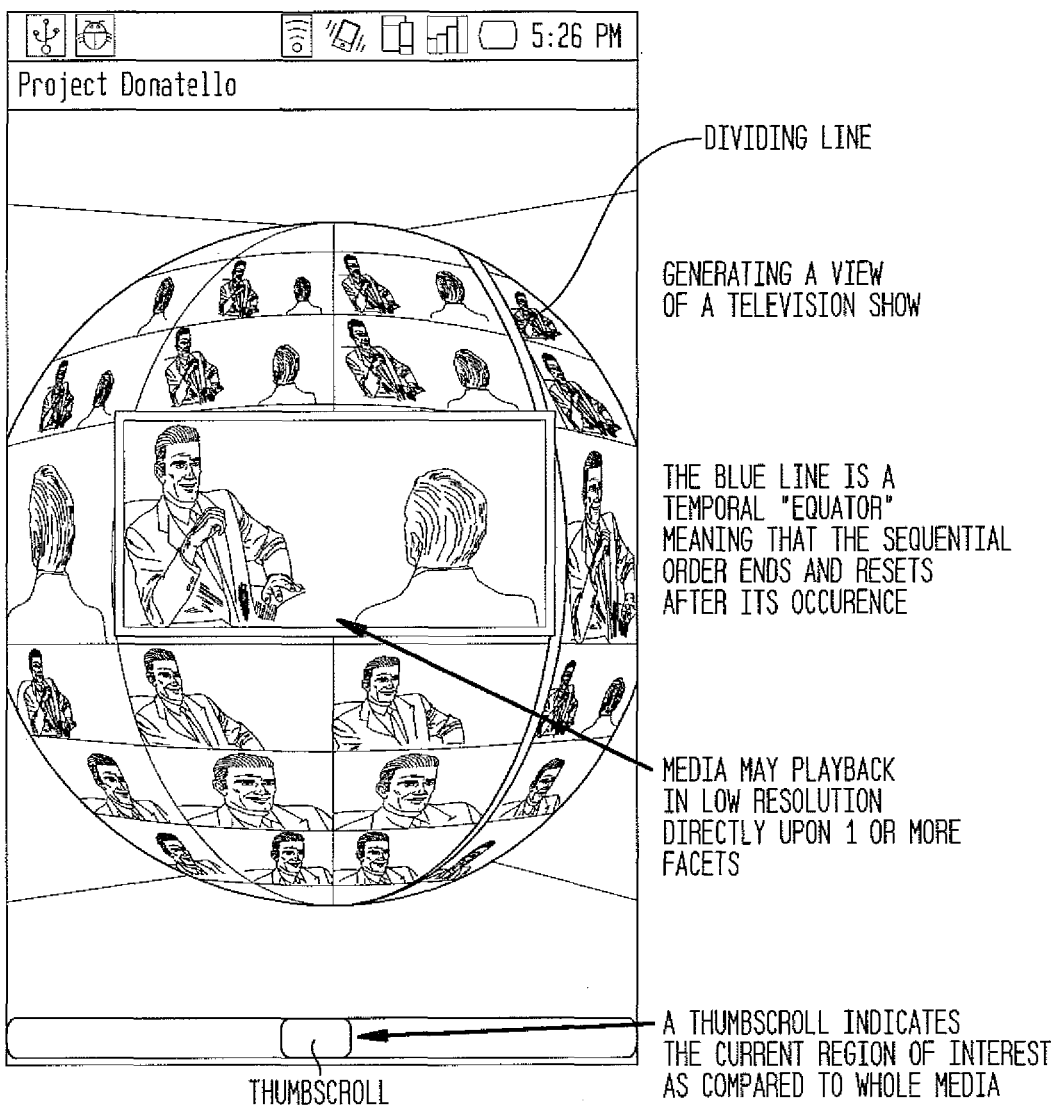
FIG. 22 shows an embodiment generating a view of a television show.

FIG. 22 shows generating a view of a television show. As with FIG. 21, the "dividing" line is the temporal "equator". Here this line indicates that the sequential order ends and resets after its occurrence. Media may playback in low resolution directly upon one or more facets, as shown. A thumb-scroll indicates the current region of interest as compared to the whole media.

Figure 23:
FIG. 23 shows an embodiment in which ads are inserted.

FIG. 23 shows context sensitive advertisements or ads inserted directly upon the surface of objects. These ads can be made interactive and clickable.

Figure 24:
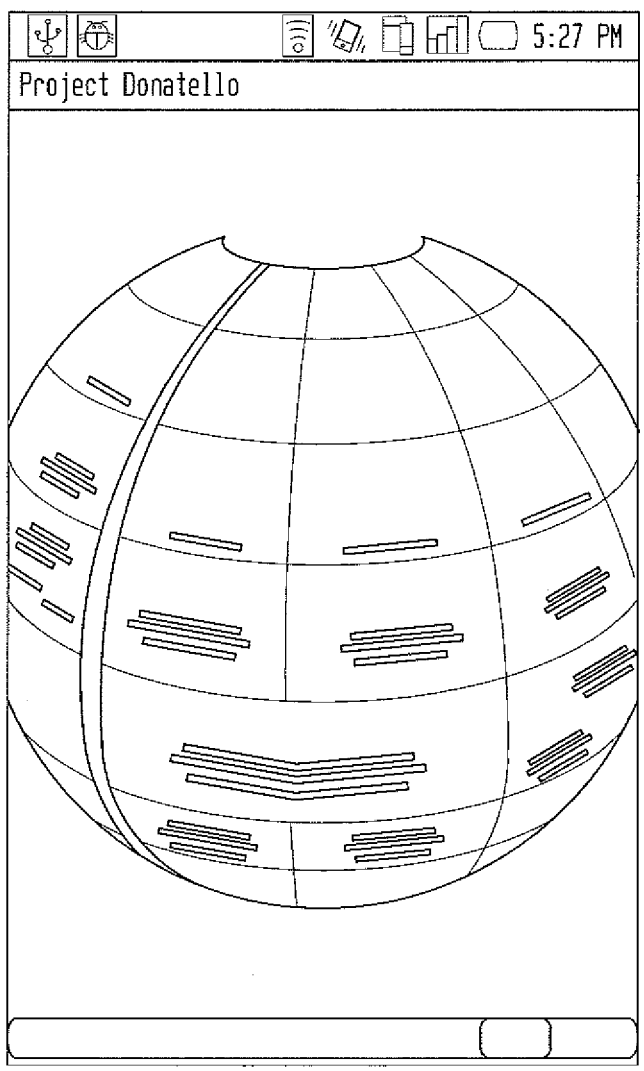
FIG. 24 shows textual information inserted and displayed.

FIG. 24 shows textual information mapped onto the object, e.g., sphere. The textual information can be mapped such that it can be skimmed and/or searched in a similar fashion to visual information. Music and/or audio and other sorts of information are also relevant and amenable to inclusion.

Figure 25:
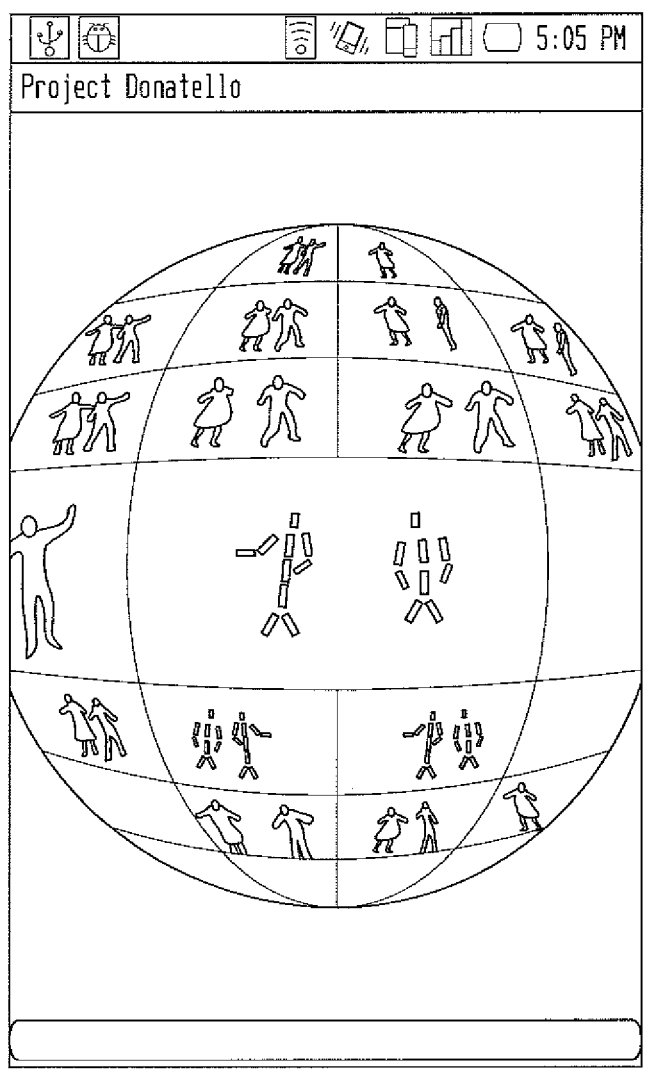
FIG. 25 shows transforming textures.

FIG. 25 shows transforming textures which can be done by applying sophisticated processes such as pose extraction. In FIG. 25, human poses have been abstracted out to simple "stick figures" which helps the user understand the essence of the video action.

Figure 26:
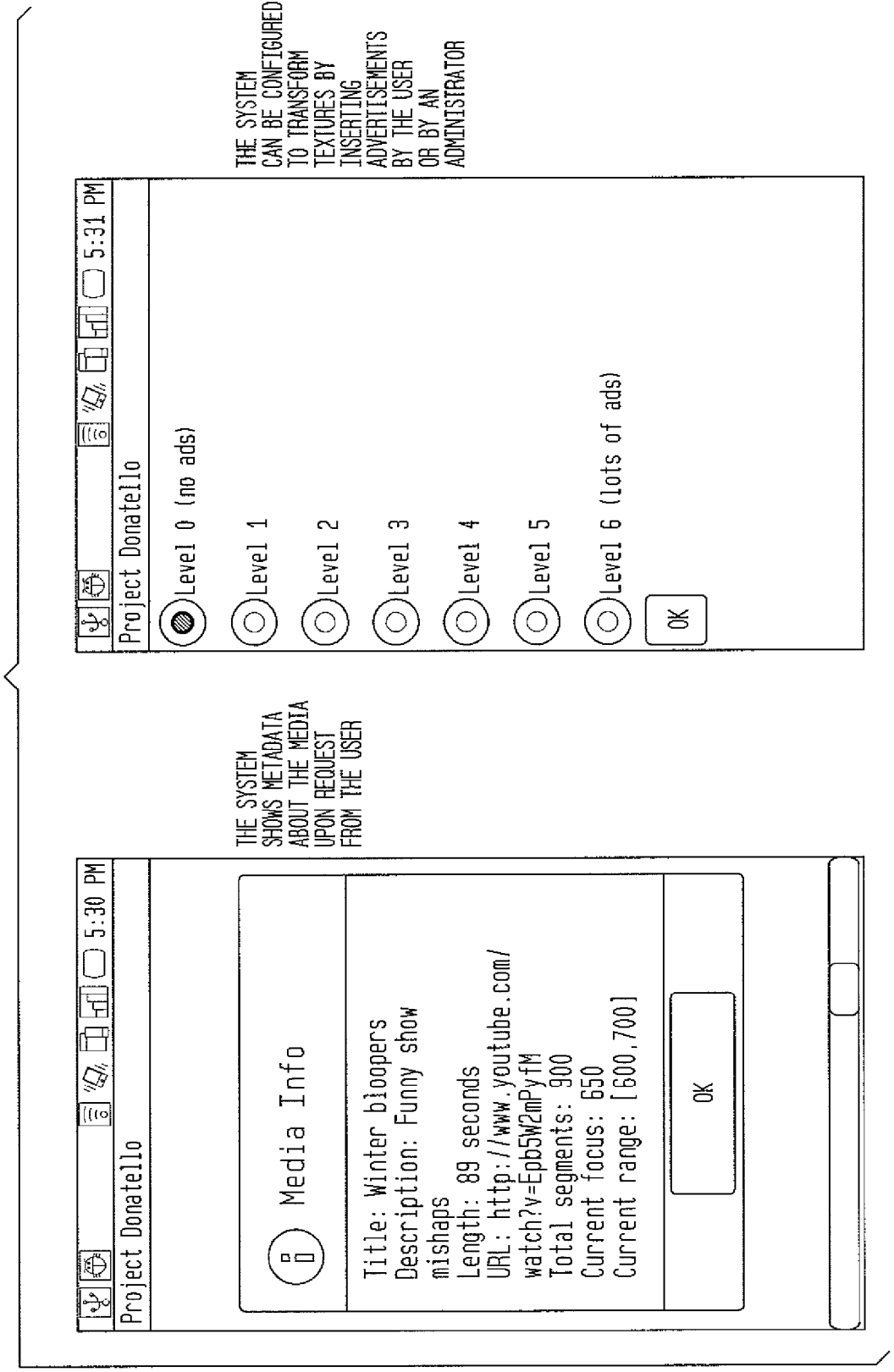
FIG. 26 shows displaying metadata and choosing a level of ad insertion.

The upper portion of FIG. 26 shows exemplary metadata about the media; this can be displayed upon request from the user. The lower portion of FIG. 26 shows user choices regarding a level of ads for insertion. As shown, the user, or system administrator, can select one level from 0 (no ads) to 6 (many ads). Based on this level, the system inserts and displays ads, for example as shown in FIG. 23.

Figure 27:
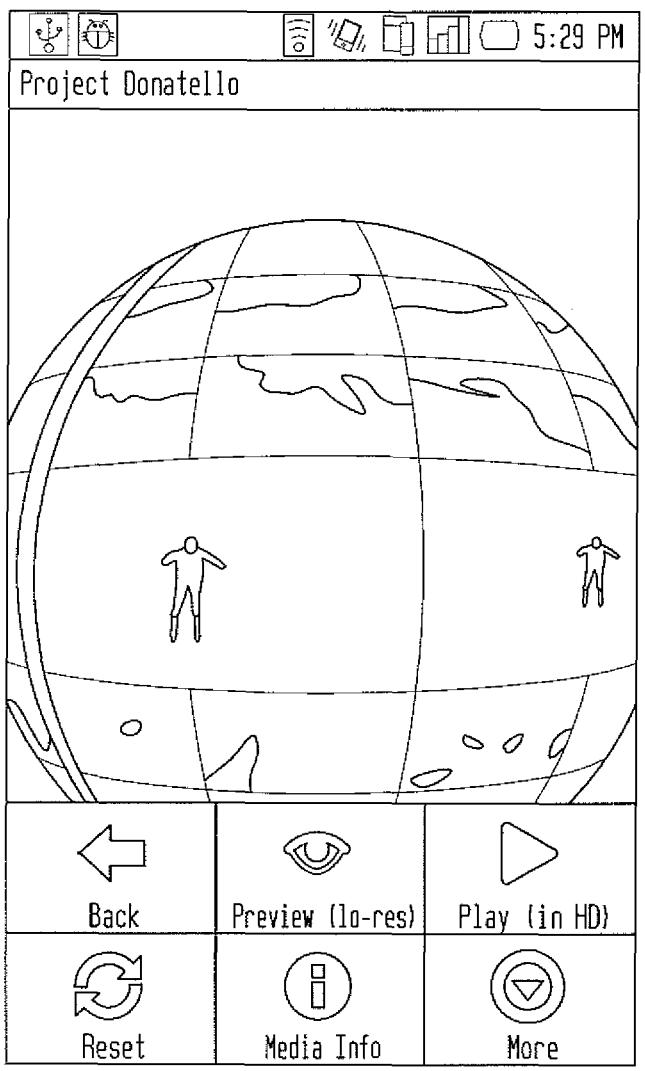
FIG. 27 shows an exemplary menu system.

FIG. 27 shows an illustrative menu system having six user options. Option Back restores previous mapping on the shape. Option Preview shows a low-resolution version of the media. Option Play displays a high-resolution version of the media. Option Reset goes back to an initial view. Option Media Info shows metadata, such as that shown in the upper portion of FIG. 26. Option More provides more options.

An exemplary system and method has been implemented on a mobile phone operating system, namely the Android Operating System. This platform is a widely distributed platform available on millions of mobile phones, tablets, and televisions. However, the invention is not limited to this embodiment and this operating system.

In this embodiment, a media server was staged on a machine in the Telcordia ATS labs which was in a position to respond to requests for media metadata and media content (frames, segments, streams). Also, the media server could present advertisement icons on demand. The media were from the realms of sports (football), cartoons and children's media, television shows, both short and long format, feature length movies, advertisements, surveillance video, and interviews. We ran our application on a mobile device with a network connection able to connect to the above Telcordia media server.

This embodiment of the invention is designed so that it would list a series of available media that could be skimmed by our invention application. The user selected one of the media and subsequently the skimming session started. The technique was highly effective and entertaining and made effective use of both screen space and network bandwidth in the mobile use case. We found that after beginning a skimming session with our invention, in many cases only about 5-10 interactions were necessary until the user could track down something of interest and choose to play the video.

The present invention overcomes the challenges of visualizing multimedia and skimming through its contents in a meaningful manner through the projection of multimedia segments onto interactive 3D shapes. Furthermore, adapting 3D shapes in accordance to content has not, to date, been done in the prior art in any systematic way.

The invention advantageously enables media summarization and skimming, as well as provides an intuitive interface technique, e.g., shapes are innately compelling to "fool around with" and immediately attracting. Beneficially, the user saves valuable time (reduces false positives). The invention is relatively pixel efficient (compared to other techniques) because it uses a great deal of the 3D shape surface for the media abstraction, wasting little; while some segments are hidden at any moment, they can be quickly and easily rotated into view via interactions. The novel technique is lightweight and reduces bandwidth as compared to streaming the high-quality version of the media to the user first, thus reducing high-definition playbacks that end up as false positives. Other advantages of the invention include: exploit perspective (foreshortening) to show contextual information, rotation giving quick skimming 'for free' (a la flip cards), intuitive and tangible user interface (as simple as rolling a ball), compact but can be enlarged arbitrarily (up to source resolution), 3D shape can be varied between media, e.g., shape surface area is one possible criteria. Moreover, while a sphere with radius $r$ has less Surface Area than cube with side $2r$, some simple compromises make them comparable, such as by showing the sphere close to the virtual camera such that some of the far regions of the sphere are clipped by the view but it still conveys useful visualized information for users. Also, some shapes allow visual continuity better than others and the invention can choose those at its discretion based on attributes of the media itself or a pre-set policy thereby giving flexibility to the 3D scene-creation aspects.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for interactive media skimming and search on a device, comprising:

a scene manager operable to build a model of a 3D scene of a multimedia segment of the media visible on a screen of the device in which one or more facets of scene objects are used to dynamically convey visual imagery as a texture from a multimedia source and operable to maintain a logical navigable relationship between the scene objects, the object facets and the multimedia segments;

an interaction manager operable to catch and manage interactions of a user with the model of the 3D scene, operable to instruct the scene manager to map screen pixels to the object facets and in turn to the multimedia segments, and operable to simplify user experience by limiting interaction parsing when in particular modes;

a user manager operable to securely store a user name, password, authorizations, and user preferences comprising at least preferred 3D scene types for particular multimedia categories;

a playback component operable to initiate one of rough playback and high definition playback in response to a user interaction and operable to determine an appropriate facet on a 3D shape in the 3D scene and to transform the multimedia such that the multimedia appears to play upon the appropriate facet;

a texturizer operable to create a 2D texture artifact from a specified set of the multimedia segments in the media for a particular target 3D facet such that resulting operations to view the texture as if stretched onto the particular target 3D facet are successful and make one or more perspective of the multimedia clearly visible on the particular target 3D facet;

a transformer operable to transform and modify pixels of one or more of chosen media segments and textures in response to requests such that the resulting 2D texture artifact contains new information via the pixels that are revealed in full only when the resulting 2D texture artifact is projected onto one or more shape facets in the 3D scene;

a cache operable to store and index one or more of the media segments, the textures, scene metadata, and the preferred 3D scene types and objects correlated to the multimedia categories and individual segments; and scene heuristics operable to maintain a set of 3D scenes comprising one or more objects, object facets, a virtual camera, and positions of the objects relative to the camera and the relationship of each set of the set of 3D scenes to a particular multimedia category or to a specific set of named multimedia resources, wherein when a valid user name and password are determined by the user manager, the scene manager builds the model in accordance with the texturizer, the transformer and the cache;

wherein one or more of the interactions caught and managed by the interaction manager are interpreted as instructions to rotate, scale, and translate 3D shapes whose surfaces have been mapped with cues, summaries, or other information relevant to the interactive media skimming and search.

2. The system according to claim 1, the scene manager further operable to select a 3D shape and a means for ordering visual information upon facets of the 3D shape wherein a series of ordered media segments are ordered such that coarse segment ordering can be visually seen upon one aspect of the 3D shape and segment action can be visible upon another aspect of the 3D shape.

3. The system according to claim 1, the scene manager further operable to perform one or more of dynamically adapting the 3D scene between skimming sessions, and dynamically creating a related media scene for any given media such that 3D shapes are placed in relation to each other and the virtual camera so that relative position of the 3D shapes and the virtual camera to a principle shape convey relevance to the principle shape and each placed 3D shape conveys media information via interactions with the texturizer and the transformer.

4. The system according to claim 1, the scene manager further operable to choose 3D shapes that have initially obscured facets and to use the texturizer and the transformer to create projections of multimedia content onto both obscured and visible facets, making a view of the initially obscured facets visible only via particular predefined user interactions.

5. The system according to claim 1, the interaction manager further operable to perform one or more of decomposing and then limiting and enhancing user interactions with the interaction manager, differentiating exploratory user interactions from user interactions showing interest or disinterest in the visible contents on the 3D scene, and affecting the virtual camera actions based on decomposed and processed user interactions.

6. The system according to claim 1, wherein the high definition playback launches an external player with metadata about a current scene and current location being browsed within the media.

7. The system according to claim 1, the texturizer further operable to perform one or more of confirming a texture file to correspond to a given request for a particular object type, and creating a texture shape for the particular object type from the specified set of media segments.

8. The system according to claim 1, the transformer further operable to receive as input identification of a media resource, and to create as output a handle to the transformed media, wherein the resulting media has one of an advertisement bitmap stitched into a form of the resulting media, the resulting media has a new form making the resulting media more suitable as a texture for a particular 3D shape, and the resulting media includes highlighted information that did not exist in the original.

9. The system according to claim 8, wherein the transformer creates the output by determining semantics of a current view item or texture, determining a preferred cardinality and placement of advertisement bitmaps, determining specific segments having associated advertisements, replacing or augmenting the specific segments with advertisement images, and storing instructions describing how to respond to inputs on the specific segments containing the advertisement images.

10. The system according to claim 8, wherein user input on particular advertisements embedded by the system into the textures results in an optional virtual camera repositioning and new information related to the particular advertisement displaying on a particular set of facets of one or more of the 3D shapes in the 3D scene.

11. The system according to claim 8, wherein a user interaction upon the 3D scene results in an adjustment comprising one or more of rotation, translation, or scale of shapes in the scene, wherein as the adjustment occurs in view of the user, the rapidly changing visible imagery conveys what appears to the user as an animated view of a multimedia segment in playback.

12. A method for interactive media skimming and search on a device, comprising steps of:
building a model of a 3D scene of a multimedia segment of the media visible on a screen of the device in which one or more facets of scene objects are used to dynamically convey visual imagery as a texture from a multimedia source and maintaining a logical navigable relationship between the scene objects, the object facets and the multimedia segments;
catching and managing interactions of a user with the model of the 3D scene, mapping screen pixels to the object facets and in turn to the multimedia segments, and simplifying user experience by limiting interaction parsing when in particular modes;
securely storing a user name, password, authorizations, and user preferences comprising at least preferred 3D scene types for particular multimedia categories;
initiating one of rough playback and high definition playback in response to a user interaction and determining an appropriate facet on a 3D shape in the 3D scene and transforming the multimedia such that the multimedia appears to play upon the appropriate facet;
creating, using a texturizer, a 2D texture artifact from a specified set of the multimedia segments in the media for a particular target 3D facet such that resulting operations to view the texture as if stretched onto the particular target 3D facet are successful and make one or more perspective of the multimedia clearly visible on the particular target 3D facet;
transforming and modifying, using a transformer, pixels of one or more of chosen media segments and textures in response to requests such that the resulting 2D texture artifact contains new information via the pixels that are revealed in full only when the resulting 2D texture artifact is projected onto one or more shape facets in the 3D scene;
storing and indexing one or more of the media segments, the textures, scene metadata, and the preferred 3D scene types and objects correlated to the multimedia categories and individual segments; and
maintaining a set of 3D scenes comprising one or more objects, object facets, a virtual camera, and positions of the objects relative to the camera and the relationship of each set of the set of 3D scenes to a particular multimedia category or to a specific set of named multimedia resources, wherein when a valid user name and password are determined, building the model is performed in accordance with the texturizer, the transformer, and storing and indexing the media segments;
wherein one or more of the interactions are interpreted as instructions to rotate, scale, and translate 3D shapes whose surfaces have been mapped with cues, summaries, or other information relevant to the interactive media skimming and search.

13. The method according to claim 12, the step of building the model further comprising selecting a 3D shape and a means for ordering visual information upon facets of the 3D shape wherein a series of ordered media segments are ordered such that coarse segment ordering can be visually seen upon one aspect of the 3D shape and segment action can be visible upon another aspect of the 3D shape.

14. The method according to claim 12, the step of building the model further comprising performing one or more of dynamically adapting the 3D scene between skimming sessions, and dynamically creating a related media scene for any given media such that 3D shapes are placed in relation to each other and the virtual camera so that relative position of the 3D shapes and the virtual camera to a principle shape convey relevance to the principle shape and each placed 3D shape conveys media information via interactions with the texturizer and the transformer.

15. The method according to claim 12, the step of building the model further comprising choosing 3D shapes that have initially obscured facets and to use the texturizer and the transformer to create projections of multimedia content onto both obscured and visible facets, making a view of the initially obscured facets visible only via particular predefined user interactions.

16. The method according to claim 12, the step of catching and managing interactions further operable to perform one or more of decomposing and then limiting and enhancing user interactions with the interaction manager, differentiating exploratory user interactions from user interactions showing interest or disinterest in the visible contents on the 3D scene, and affecting the virtual camera actions based on decomposed and processed user interactions.

17. The method according to claim 12, wherein the high definition playback launches an external player with metadata about a current scene and current location being browsed within the media.

18. The method according to claim 12, the step of creating the 2D artifact further comprising one or more of confirming a texture file to correspond to a given request for a particular object type, and creating a texture shape for the particular object type from the specified set of media segments.

19. The method according to claim 12, the step of transforming and modifying pixels of the one or more chosen media segments further comprising receiving as input identification of a media resource, and creating as output a handle to the transformed media, wherein the resulting media has one of an advertisement bitmap stitched into a form of the resulting media, the resulting media has a new form making the resulting media more suitable as a texture for a particular 3D shape, and the resulting media includes highlighted information that did not exist in the original.

20. The method according to claim 19, wherein the output is created by determining semantics of a current view item or texture, determining a preferred cardinality and placement of advertisement bitmaps, determining specific segments having associated advertisements, replacing or augmenting the specific segments with advertisement images, and storing instructions describing how to respond to inputs on the specific segments containing the advertisement images.

21. The method according to claim 19, wherein user input on particular advertisements embedded by the system into the textures results in an optional virtual camera repositioning and new information related to the particular advertisement displaying on a particular set of facets of one or more of the 3D shapes in the 3D scene.

22. The method according to claim 19, wherein a user interaction upon the 3D scene results in an adjustment comprising one or more of rotation, translation, or scale of shapes in the scene, wherein as the adjustment occurs in view of the user, the rapidly changing visible imagery conveys what appears to the user as an animated view of a multimedia segment in playback.

23. A non-transitory computer readable storage medium storing a program of instructions executable by a machine to perform a method for interactive media skimming and search on a device, comprising:

building a model of a 3D scene of a multimedia segment of the media visible on a screen of the device in which one or more facets of scene objects are used to dynamically convey visual imagery as a texture from a multimedia source and maintaining a logical navigable relationship between the scene objects, the object facets and the multimedia segments;

catching and managing interactions of a user with the model of the 3D scene, mapping screen pixels to the object facets and in turn to the multimedia segments, and simplifying user experience by limiting interaction parsing when in particular modes;

securely storing a user name, password, authorizations, and user preferences comprising at least preferred 3D scene types for particular multimedia categories;

initiating one of rough playback and high definition playback in response to a user interaction and determining an appropriate facet on a 3D shape in the 3D scene and transforming the multimedia such that the multimedia appears to play upon the appropriate facet;

creating a 2D texture artifact from a specified set of the multimedia segments in the media for a particular target 3D facet such that resulting operations to view the texture as if stretched onto the particular target 3D facet are successful and make one or more perspective of the multimedia clearly visible on the particular target 3D facet;

transforming and modifying pixels of one or more of chosen media segments and textures in response to requests such that the resulting 2D texture artifact contains new information via the pixels that are revealed in full only when the resulting 2D texture artifact is projected onto one or more shape facets in the 3D scene;

storing and indexing one or more of the media segments, the textures, scene metadata, and the preferred 3D scene types and objects correlated to the multimedia categories and individual segments; and maintaining a set of 3D scenes comprising one or more objects, object facets, a virtual camera, and positions of the objects relative to the camera and the relationship of each set of the set of 3D scenes to a particular multimedia category or to a specific set of named multimedia resources, wherein when a valid user name and password are determined, building the model is performed in accordance with creating the 2D texture artifact, transforming and modifying the pixels of the one or more chosen media segments, and storing and indexing the media segments;

wherein one or more of the interactions caught and managed by the interaction manager are interpreted as instructions to rotate, scale, and translate 3D shapes whose surfaces have been mapped with cues, summaries- or other information relevant to the interactive media skimming and search.

\* \* \* \* \*

UNITED STATES PATENT AND TRADEMARK OFFICE
CERTIFICATE OF CORRECTION

PATENT NO. : 8,762,890 B2  
APPLICATION NO. : 13/191773  
DATED : June 24, 2014  
INVENTOR(S) : Falchuk et al.

Page 1 of 1

It is certified that error appears in the above-identified patent and that said Letters Patent is hereby corrected as shown below:

Title Page, on Page 2, in item (56), under "OTHER PUBLICATIONS", in Column 2, Line 2, delete "Snriartphones,"" and insert -- Smartphones," --, therefor.

In the Drawings:

In Fig. 11, Sheet 12 of 28, delete Tag "SCB" and insert Tag -- SC8 --, therefor.

In Fig. 19, Sheet 20 of 28, in Lines 1-2, delete "WITH WITH" and insert -- WITH --, therefor.

In Fig. 21, Sheet 22 of 28, in Line 8, delete "OCCURENCE" and insert -- OCCURRENCE --, therefor.

In Fig. 22, Sheet 23 of 28, in Line 8, delete "OCCURENCE" and insert -- OCCURRENCE --, therefor.

In the Specification:

In Column 2, Lines 33-34, delete "gaining" and insert -- gaming --, therefor.

In Column 4, Line 66, delete "info nation" and insert -- information --, therefor.

In Column 12, Line 26, delete "dis-interest" and insert -- disinterest --, therefor.

In Column 18, Line 45, delete "stroller" and insert -- scroller --, therefor.

Signed and Sealed this
Fourth Day of November, 2014

Michelle K. Lee
*Deputy Director of the United States Patent and Trademark Office*